(12) United States Patent
Mohammed et al.

(10) Patent No.: US 12,428,232 B1
(45) Date of Patent: Sep. 30, 2025

(54) SUBTERRANEAN BANDED IRON BASED INJECTION FLUID FOR HYDROGEN STORAGE

(71) Applicant: King Fahd University of Petroleum and Minerals, Dhahran (SA)

(72) Inventors: Isah Mohammed, Dhahran (SA); Dhafer Abdullah Al Shehri, Dhahran (SA); Mohamed Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/222,637

(22) Filed: May 29, 2025

(51) Int. Cl.
*B65G 5/00* (2006.01)
*C01B 3/00* (2006.01)

(52) U.S. Cl.
CPC .............. *B65G 5/00* (2013.01); *C01B 3/0084* (2013.01)

(58) Field of Classification Search
CPC ........ C01B 3/0084; F17C 1/007; E21B 43/00; B65G 5/00
See application file for complete search history.

(56) References Cited

U.S. PATENT DOCUMENTS

| | | | |
|---|---|---|---|
| 2007/0298479 A1* | 12/2007 | Larter | B09C 1/10 435/168 |
| 2023/0050105 A1* | 2/2023 | Ben-Zvi | E21B 41/0064 |
| 2023/0323756 A1 | 10/2023 | Darrah et al. | |
| 2023/0391614 A1* | 12/2023 | Johnson | F17C 1/007 |
| 2023/0392485 A1* | 12/2023 | Johnson | E21B 43/164 |
| 2024/0240539 A1 | 7/2024 | Okuno et al. | |

FOREIGN PATENT DOCUMENTS

| | | |
|---|---|---|
| CN | 103420334 A | 12/2013 |
| CN | 118306949 A | 7/2024 |
| KR | 101543322 B1 * | 8/2015 |

OTHER PUBLICATIONS

Shuo Zhan, et al., "Geochemical modelling on the role of redox reactions during hydrogen underground storage in porous media", International Journal of Hydrogen Energy, vol. 50, Part D, Jul. 12, 2023, pp. 19-35.

Arkajyoti Pathak, et al, "Effect of Iron Mineral Transformation on Long-Term Subsurface Hydrogen Storage—Results from Geochemical Modeling", Fuels. vol. 5, Aug. 1, 2024, pp. 334-346.

Sakae Takenaka, et al., "Storage and formation of pure hydrogen mediated by the redox of modified iron oxides", Applied Catalysis A: General, vol. 282, Issues 1-2, 2005, Mar. 2005, pp. 333-341, Excerpts only, 4 pages.

* cited by examiner

*Primary Examiner* — Carib A Oquendo
(74) *Attorney, Agent, or Firm* — Oblon, McClelland, Maier &Neustadt, L.L.P.

(57) ABSTRACT

A method of hydrogen storage is described. The method includes injecting hydrogen into a subterranean banded iron formation, including magnetite, hematite, and/or pyrite, where the hydrogen is mainly hydrogen ($H_2$) gas based on the total volume of the hydrogen. Further, the subterranean banded iron formation includes mainly magnetite, hematite, and/or pyrite based on a total weight of the subterranean banded iron formation, where the hydrogen is adsorbed on the magnetite, the hematite, and/or the pyrite. Further, the method includes injecting ethylenediaminetetraacetic acid into the subterranean banded iron formation to release the hydrogen from the magnetite, the hematite, and/or the pyrite.

20 Claims, 19 Drawing Sheets

SUBTERRANEAN BANDED IRON BASED INJECTION FLUID FOR HYDROGEN STORAGE

BACKGROUND

Technical Field

The present disclosure is directed to a method of hydrogen storage, more particularly towards a method of hydrogen storage in a subterranean banded iron formation including magnetite, hematite, and/or pyrite, for adsorption.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Around the world, much of the discussion focuses on finding more sustainable and environmentally friendly energy sources. It is because greenhouse gas emissions from human activity have an evident consequence. Countries and organizations globally are in a race to identify the most environmentally friendly fuel alternative to replace fossil fuel, with hydrogen emerging as a leading candidate for a sustainable and clean energy future. Hydrogen reacts with oxygen in a fuel cell to produce power which is used to drive cars, with the product being water vapor. However, the characteristics of hydrogen which gives it an advantage and makes it a greener option is one of its major drawbacks. To begin with, like fossil fuels, hydrogen is light and highly combustible. As a result, large investments in fire safety systems are needed. The fact that hydrogen is difficult to handle and needs considerable compression (350-700 bar) to be conveniently stored in tanks for lengthy trips is another disadvantage of using hydrogen as an automotive fuel. Transporting it is even more difficult because pipelines intended for natural gas and methane cannot be utilized for hydrogen unless the concentration of hydrogen is extremely low. The sustainability of hydrogen supply is another significant obstacle to its use as a fuel.

Another significant disadvantage of using hydrogen is the matter of bulk hydrogen storage and retrieval for future use. Due to the requirement of substantial volume and high-pressure during storage, the concept of subsurface hydrogen storage has emerged. Additionally, there is a need to devise a retrieval strategy to minimize hydrogen gas losses and ensure the security of underground storage. Different subterranean hydrogen storage methods include salt caverns, depleted oil and gas fields, and aquifers. Salt caverns are preferred for their impermeability and ability to withstand high pressures, but they may be expensive to create and are limited to specific geographical locations. Depleted oil and gas fields offer a cost-effective option by reusing existing infrastructure, but they may have leakage risks and limited capacity. Aquifers, which are underground water-bearing formations, may be used, but they are more difficult to manage and may have lower storage efficiency due to their geological variability. All methods face common disadvantages, such as hydrogen leakage due to the small size of hydrogen molecules, high operational and maintenance costs, environmental concerns like contamination of groundwater, and challenges in ensuring long-term stability of the storage sites. Given the considerations, concerns have been raised regarding the application of hydrogen gas both as a fuel and for underground storage.

The prospect of geo-storing hydrogen has surfaced recently and is still garnering a lot of interest from institutions and academics. Like $CO_2$ storage, there is believed to be potential for both bulk and adsorbed hydrogen storage. Several researchers have examined various rocks in the context of bulk storage (sandstone, clays, coal, carbonates, basalt etc.) for the potential for hydrogen storage. More precisely, low permeability minerals that are primarily found as caprocks, including anhydrite and shales, have drawn interest. The parameters used in the experiments to evaluate storage capability are the wettability of the rock by hydrogen and the permeability of hydrogen through the minerals.

Density Functional Theory (DFT) analysis combined with experimental data has been used to study the hydrogen-silica-clay shale interaction [See: Al-Harbi A, Al-Marri M, Carchini G, Saad M, Hussein I A. *Hydrogen underground storage in silica-clay shales: experimental and density functional theory investigation*]. The findings reveal that there was no interaction or adsorption of hydrogen on the Midra rock system at the investigated temperatures and pressures (50° C.-100° C. and up to 20 bar). The authors proposed it to suggest that the hydrogen stored in the silica-clay rocks under investigation is secured. The authors therefore suggest that silica-clay-rich shale systems may be used to store hydrogen in large quantities, however, no indication of how the hydrogen may be recovered from the storage was provided. It may be achieved by continuously expanding the gas that has been stored, but according to the assumptions of authors, bulk storage—rather than adsorption—was the focus of their investigation. Analysis of hydrogen-iron interaction shows that the nature of the interaction is physical thus, hydrogen exists in a physiosorbed state [See: Sanchez M, Ruette F, Hernandez A J. *Theoretical study of the hydrogen interaction with iron (0), iron (1+), and iron (1−) atoms*]. More so, not all the surfaces of iron-bearing minerals are thermodynamically and kinetically favored in terms of hydrogen interaction. The case was with pyrite whose interaction with hydrogen was assessed using density functional theory (DFT) calculations [See: Liu J, Yang T, Peng Q, Yang Y, Li Y-W, Wen X-D. *Theoretical exploration of the interaction between hydrogen and pyrite-type $FeS_2$ surfaces*]. Earlier reports on interaction of pyrites with hydrogen at temperature values of 90° C.-180° C. exist in the literature [See: Betelu S, Lerouge C, Berger G, Giffaut E, Ignatiadis I. *Mechanistic and kinetic study of pyrite ($FeS_2$)-hydrogen ($H_2$) interaction at 25° C. using electrochemical techniques*]. In the report, it was said that at such conditions, the formation of pyrrhotite and mackinawite were observed however, dependent on the system pH and occurred at pH values 9 and 12 respectively. Another disclosure revealed that the interaction of hydrogen with iron interfaces reduces the surface energy of the surfaces, thus, creating nanovoids in iron surfaces [See: Islam M M, Zou C, van Duin A C T, Raman S. *Interactions of hydrogen with the iron and iron carbide interfaces*].

Despite extensive research in the literature, the $H_2$-iron system has not been examined in a manner that offers a solution to the hydrogen storage issue. More specifically, the debate around subterranean hydrogen storage has focused primarily not only on retrieving the stored hydrogen but also on minimizing hydrogen loss. Thus, how to securely inject and store hydrogen underneath has gained attention. It is crucial because the fuel that is utilized daily needs to be produced in advance to be stored for use later. Therefore, if hydrogen is to replace fossil fuels, careful consideration must be given to the most efficient ways to store and extract hydrogen from storage media as part of assessing the potential of the technology. Furthermore, moving hydrogen (application in transportation as fuel) from one place to another has proven to be quite difficult. If a method may be developed to adsorb hydrogen onto a material (in an adsorbed state) and then transport it safely, it could be a significant breakthrough. This could potentially revolutionize the way hydrogen transportation is viewed and handled.

Each of the aforementioned $H_2$ storage processes suffer from one or more drawbacks hindering their adoption. Accordingly, one object of the present disclosure to provide methods and systems for $H_2$ storage that may circumvent the drawbacks, such as, high operational and maintenance cost, short term stability, hydrogen loss through leakage, of the materials known in the art.

SUMMARY

In an exemplary embodiment, a method of hydrogen storage is described. The method includes injecting hydrogen into a subterranean banded iron formation including magnetite, hematite, and/or pyrite, where the hydrogen is mainly hydrogen ($H_2$) gas based on a total volume of the hydrogen. The subterranean banded iron formation includes mainly magnetite, hematite, and/or pyrite based on a total weight of the subterranean banded iron formation, where the hydrogen is adsorbed on the magnetite, the hematite, and/or the pyrite. Further the method includes injecting ethylenediaminetetraacetic acid into the subterranean banded iron formation to release the hydrogen from the magnetite, the hematite, and/or the pyrite.

In some embodiments, the method includes injecting a brine solution into the subterranean banded iron formation before injecting the hydrogen.

In some embodiments, the method includes injecting an ethylenediaminetetraacetic acid solution into the subterranean banded iron formation before injecting the hydrogen.

In some embodiments, the subterranean banded iron formation is at least 80% by weight hematite and has a hydrogen index of 520 milligram (mg) to 530 mg $H_2$/g.

In some embodiments, the subterranean banded iron formation is at least 80% by weight magnetite and has a hydrogen index of 540 to 550 mg $H_2$/g.

In some embodiments, the subterranean banded iron formation is at least 80% by weight magnetite and has a hydrogen index of 640 to 670 mg $H_2$/g.

In some embodiments, the subterranean banded iron formation is at least 80% by weight hematite and has a hydrogen index of 740 to 770 mg $H_2$/g.

In some embodiments, the subterranean banded iron formation is at least 80% by weight hematite and has a hydrogen index of 670 to 690 mg $H_2$/g.

In some embodiments, the subterranean banded iron formation is at least 80% by weight pyrite and has a hydrogen index of 520 to 540 mg $H_2$/g.

In some embodiments, the brine solution includes sodium chloride, sodium bicarbonate, sodium sulfate, magnesium chloride, and calcium chloride.

In some embodiments, the subterranean banded iron formation includes at least 80% by weight magnetite and has an average grain size of 50 micrometre (μm) to 55 μm.

In some embodiments, the subterranean banded iron formation includes at least 80% by weight hematite and has an average grain size of 25 μm to 30 μm.

In some embodiments, the subterranean banded iron formation includes at least 80% by weight pyrite and has an average grain size of 5 μm to 10 μm.

In some embodiments, a pressure of the hydrogen in the subterranean banded iron formation is 500 pounds per square inch (psi) to 1500 psi.

In some embodiments, the subterranean banded iron formation is at a temperature of 50° C. to 100° C. during the injecting.

In some embodiments, the subterranean banded iron formation magnetite includes 66 percent by weight (wt. %) to 72 wt. % iron(II, III) oxide, 25 wt. % to 30 wt. % silicon dioxide ($SiO_2$), and 1 wt. % to 4 wt. % vermiculite ((Mg, $Fe^{2+}$, $Fe^{3+}$)$_3$[(Al, Si)$_4$O$_{10}$](OH)$_2$·4H$_2$O) based on a total weight of the magnetite.

In some embodiments, the subterranean banded iron formation hematite includes at least 99 wt. % iron (III) oxide based on a total weight of the hematite.

In some embodiments, the subterranean banded iron formation pyrite includes 80 wt. % to 85 wt. % iron sulfide ($FeS_2$) and 15 wt. % to 20 wt. % $SiO_2$ based on a total weight of the pyrite.

In some embodiments, the brine solution has a total dissolved solids concentration of 57,000 parts per million (ppm) to 58,000 ppm.

In some embodiments, the subterranean banded iron formation includes at least 80% by weight hematite and a binding energy of the hydrogen to the hematite is −13 to −11 kcal/mol.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof may be readily obtained as the same becomes better understood by reference to the following detailed description when considered in connection with the accompanying drawings, wherein.

DETAILED DESCRIPTION

Figure 1:
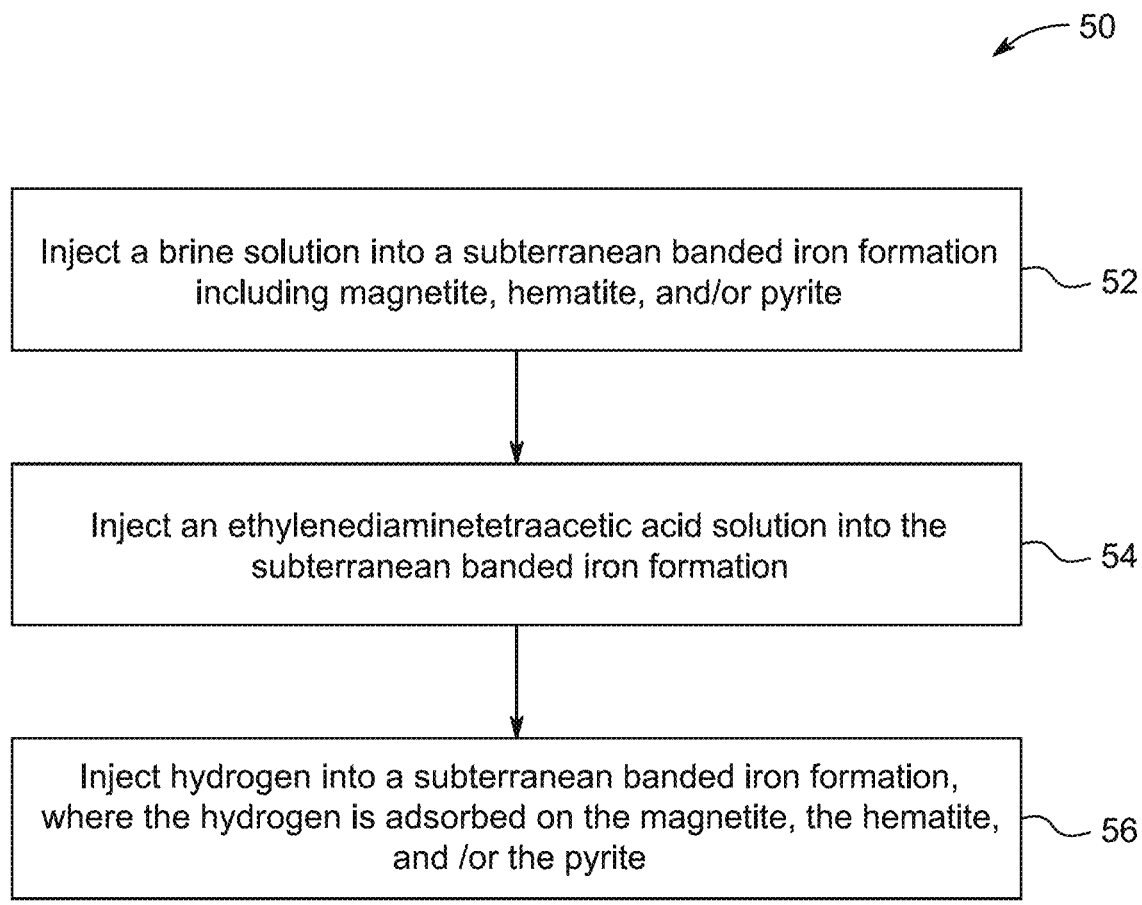
FIG. 1 is a schematic flowchart of a method of hydrogen storage, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, the term "subterranean" refers to to something that is located beneath the surface of the earth. Specifically, it describes the banded iron formation that is found underground, as opposed to being exposed on the surface. So, the hydrogen is being injected into rock formations located below ground that contain magnetite, hematite, and/or pyrite.

As used herein, the term "average grain size" refers to the typical size of the individual mineral crystals (or "grains") within a rock or material. In the context of the disclosure, it represents the mean diameter of the magnetite grains within the subterranean banded iron formation. The average grain size is usually determined by measuring a representative sample of grains and calculating their average size, often in micrometers (μm).

As used herein, the term "subterranean" banded iron formation (BIF)" refers a type of sedimentary rock that forms in ancient marine environments. It is characterized by alternating layers of iron-rich minerals, such as magnetite ($Fe_3O_4$), hematite ($Fe_2O_3$), and sometimes pyrite ($FeS_2$), along with silica ($SiO_2$) or other minerals. Such formations are often composed of thin, alternating bands of iron oxide minerals and chert or silica-rich material. Banded iron formations are significant in geological studies because they provide important evidence about the early atmosphere of Earth and the development of oxygen-rich conditions, which contributed to the evolution of life.

As used herein, the term "total dissolved solids concentration" refers to the total amount of dissolved substances, such as salts, minerals, and organic matter, present in a liquid, typically measured in milligrams per liter (mg/L) or parts per million (ppm).

As used herein, the term "brine solution" refers to a high-concentration mixture of water and dissolved salts, primarily sodium chloride (NaCl), but it may contain other minerals. It is often used in industrial processes, food preservation, or as a byproduct of certain operations like oil and gas extraction.

As used herein, the term "binding energy of the hydrogen" refers to the amount of energy required to break the bond between hydrogen atoms in a molecule, such as in $H_2$, or to separate a hydrogen atom from an atom or molecule. It is a measure of the stability of the hydrogen bond or molecule.

Aspects of this disclosure pertain to a method of hydrogen storage by being adsorbed within a subterranean banded iron formation, including magnetite, hematite, and/or pyrite, and its subsequent retrieval by injecting another injection fluid. Presently there is no mechanism in place that ensures that hydrogen stored underground may be retrieved. The present disclosure circumvents the drawbacks of prior art by addressing key limitations such as high operational and maintenance costs, short-term stability, and hydrogen loss through leakage, of the materials known in the art. The present invention seeks to solve the challenge of underground hydrogen storage, specifically focusing on how it can be safely retrieved while ensuring the security of the hydrogen gas in storage.

FIG. 1 illustrates a schematic flow chart of a method 50 of hydrogen storage. The order in which the method 50 is described is not intended to be construed as a limitation, and any number of the described method steps may be combined to implement the method 50. Additionally, individual steps may be removed or skipped from the method 50 without departing from the spirit and scope of the present disclosure.

At step 52, the method 50 includes injecting a brine solution into a subterranean banded iron formation. A subterranean banded iron formation is a deep underground layer of rock characterized by alternating bands of iron-rich minerals (such as magnetite, hematite, and pyrite) and silica-rich material (like chert or quartz). In some embodiments, the subterranean banded iron formations include goethite, siderite, limonite, ferrihydrite, maghemite, and chlorite. In a preferred embodiment, the subterranean banded iron formation mainly includes magnetite, hematite, and/or pyrite In some embodiments, the subterranean banded iron formation magnetite includes 36 to 42 percent by weight (wt. %) iron (II, III) oxide, 10 to 15 wt. % silicon dioxide ($SiO_2$), and 0.01 to 0.05 wt. % vermiculite (($Mg$, $Fe^{2+}$, $Fe^{3+}$)$_3$[($Al$, $Si$)$_4O_{10}$]($OH$)$_2 \cdot 4H_2O$) based on a total weight of the magnetite. In some other embodiments, the subterranean banded iron formation magnetite includes 46 to 52 percent by weight (wt. %) iron (II, III) oxide, 11 to 16 wt. % silicon dioxide ($SiO_2$), and 0.05 to 1 wt. % vermiculite (($Mg$, $Fe^{2+}$, $Fe^{3+}$)$_3$[($Al$, $Si$)$_4O_{10}$]($OH$)$_2 \cdot 4H_2O$) based on a total weight of the magnetite. Yet, in another embodiment, the subterranean banded iron formation magnetite includes 56 to 62 percent by weight (wt. %) iron(II, III) oxide, 18 to 25 wt. % silicon dioxide ($SiO_2$), and 1 to 3 wt. % vermiculite (($Mg$, $Fe^{2+}$, $Fe^{3+}$)$_3$[($Al$, $Si$)$_4O_{10}$]($OH$)$_2 \cdot 4H_2O$) based on the total weight of the magnetite. In a preferred embodiment, the subterranean banded iron formation magnetite includes 66 to 72 percent by weight (wt. %) iron (II, III) oxide, 25 to 30 wt. % silicon dioxide ($SiO_2$), and 1 to 4 wt. % vermiculite (($Mg$, $Fe^{2+}$, $Fe^{3+}$)$_3$[($Al$, $Si$)$_4O_{10}$]($OH$)$_2 \cdot 4H_2O$) based on a total weight of the magnetite.

In some embodiments, the subterranean banded iron formation hematite includes at least 75 wt. % iron (III) oxide based on a total weight of the hematite, preferably 85 wt. % iron (III) oxide based on a total weight of the hematite, and more preferably 99 wt. % iron (III) oxide based on a total weight of the hematite. In a preferred embodiment, the subterranean banded iron formation hematite includes at least 99 wt. % iron (III) oxide based on a total weight of the hematite.

In some embodiments, the subterranean banded iron formation pyrite includes 50 to 55 wt. % iron sulfide ($FeS_2$) and 5 to 8 wt. % $SiO_2$ based on a total weight of the pyrite, preferably 55 to 60 wt. % iron sulfide ($FeS_2$) and 8 to 11 wt. % $SiO_2$ based on a total weight of the pyrite, and more preferably 70 to 75 wt. % iron sulfide ($FeS_2$) and 14 to 18 wt. % $SiO_2$ based on a total weight of the pyrite. In a preferred embodiment, the subterranean banded iron formation pyrite includes 80 to 85 wt. % iron sulfide ($FeS_2$) and 15 to 20 wt. % $SiO_2$ based on a total weight of the pyrite.

In some embodiments, in addition to iron sulfide ($FeS_2$) and silica ($SiO_2$), other components that may be present in pyrite within a subterranean banded iron formation may include trace amounts of other sulfur compounds, minor amounts of metals like copper, zinc, or nickel, and other minerals such as clay or carbonates. However, these are typically present in much smaller quantities.

In some embodiments, the subterranean banded iron formation includes at least 60% by weight magnetite and has an average grain size of 30 to 35 μm, preferably at least 65% by weight magnetite and has an average grain size of 35 to 40 μm, preferably at least 70% by weight magnetite and has an average grain size of 40 to 45 μm, and more preferably at least 75% by weight magnetite and has an average grain size of 45 to 50 μm. In a preferred embodiment, the subterranean banded iron formation includes at least 80% by weight magnetite and has an average grain size of 50 to 55 μm.

In some embodiments, the subterranean banded iron formation includes at least 60% by weight hematite and has an average grain size of 10 to 15 μm, preferably at least 65% by weight hematite and has an average grain size of 15 to 20 μm, preferably at least 70% by weight hematite and has an average grain size of 20 to 25 μm, and more preferably at least 75% by weight hematite and has an average grain size of 21 to 24 μm. In a preferred embodiment, the subterranean banded iron formation includes at least 80% by weight hematite and has an average grain size of 25 to 30 μm.

In some embodiments, the subterranean banded iron formation includes at least 60% by weight pyrite and has an average grain size of 0.01 to 0.05 μm, preferably at least 65% by weight pyrite and has an average grain size of 0.05 to 1 μm, preferably at least 70% by weight pyrite and has an average grain size of 1 to 4 μm, and more preferably at least 75% by weight pyrite and has an average grain size of 4 to 8 μm. In a preferred embodiment, the subterranean banded iron formation includes at least 80% by weight pyrite and has an average grain size of 5 to 10 μm.

Injecting a brine solution first helps to stabilize the subterranean banded iron formation, maintain pressure, and reduce the risk of clogging or mineral precipitation during subsequent hydrogen injection. The brine solution may help facilitate the dissolution of minerals, improve fluid flow within the formation, and prepare the environment for more effective hydrogen injection by creating a more favorable chemical and physical condition for the process.

In some embodiments, the brine solution includes sodium chloride ($NaCl$), calcium chloride ($CaCl_2$)), or magnesium chloride ($MgCl_2$), along with other dissolved minerals to enhance the ionic strength. It may include trace amounts of other salts like potassium chloride ($KCl$) or sodium bicarbonate ($NaHCO_3$), depending on the specific requirements of the formation and the process. In a specific embodiment, the brine solution includes $NaCl$, $NaHCO_3$, $Na_2SO_4$, $MgCl_2$, and $CaCl_2$. In some embodiments, the brine solution includes, by mass, ions of, $Na^+$: 5,000-50,000 parts per million (ppm), more preferably 15,000-20,000 ppm, and yet more preferably 18,300; $Ca^{2+}$: 100-1,500 ppm, more preferably 600-700 ppm, and yet more preferably 650 ppm; $Mg^{2+}$: 500-5,000 ppm, more preferably 2,000-3,000 ppm, and yet more preferably 2,110 ppm; $SO_4^{2-}$: 1,000-9,000 ppm, more preferably 4,000-5,000 ppm, and yet more preferably 4,290 ppm; $Cl^-$: 10,000-70,000 ppm, more preferably 32,000-33,000 ppm, and yet more preferably 32,200 ppm; and $HCO_3^-$: 10-500 ppm, more preferably 100-150 ppm, and yet more preferably 120 ppm. The composition of the brine solution is designed to stabilize the formation, facilitate fluid flow, and potentially help in dissolving minerals before the injection of hydrogen.

In some embodiments, the brine solution has a total dissolved solids concentration of 35000 to 40,000 ppm, preferably 45000 to 50,000 ppm, and more preferably 48000 to 55,000 ppm. In a preferred embodiment, the brine solution has a total dissolved solids concentration of 57,000 to 58,000 ppm. The specified total dissolved solids (TDS) concentration of 57,000 to 58,000 ppm in the brine solution is required to ensure that the solution has the appropriate salinity level, which is critical for the desired chemical reactions or processes in the method, such as optimizing the extraction or reduction processes in the subterranean formation.

At step 54, the method 50 includes injecting an ethylenediaminetetraacetic acid (EDTA) solution into the subterranean banded iron formation. Injecting an EDTA solution first helps to chelate and dissolve iron minerals like magnetite, hematite, and pyrite in the subterranean banded iron formation. The process breaks down the iron compounds and releases hydrogen in a controlled manner, making it easier for the subsequent hydrogen injection to be more effective.

At step 56, the method 50 includes injecting hydrogen into a subterranean banded iron formation, wherein the hydrogen is adsorbed on the magnetite, the hematite, and/or the pyrite. In the present disclosure, at least 30%, preferably 40%, preferably 50%, preferably 60%, preferably 65%, preferably 75%, preferably 80%, preferably 85%, preferably 90%, preferably 95%, preferably 96%, preferably 97%, preferably 98%, preferably 99%, preferably 99.5%, preferably 100% of the hydrogen is injected mainly as hydrogen ($H_2$) gas based on the total volume of the hydrogen. The hydrogen is adsorbed on the magnetite, the hematite, and/or the pyrite.

In some embodiments, a pressure of the hydrogen in the subterranean banded iron formation is 100 to 200 psi, preferably 200 to 300 psi, preferably 400 to 600 psi, preferably 450 to 650 psi, and more preferably 500 to 1200 psi. In a preferred embodiment, pressure of the hydrogen in the subterranean banded iron formation is 500 to 1500 psi. The pressure of 500 to 1500 psi in the subterranean banded iron formation ensures optimal conditions for the reaction between hydrogen and the iron-bearing minerals, facilitating efficient reduction processes such as converting hematite or magnetite to magnetite or iron.

In some embodiments, the subterranean banded iron formation is at a temperature of 30 to 60° C. during the injecting process (in all the embodiments as described earlier), preferably 15 to 65° C., preferably 25 to 75° C., preferably 35 to 85° C., and more preferably 45 to 95° C. In a preferred embodiment, the subterranean banded iron formation is at a temperature of 50 to 100° C. during the injecting process. The temperature range is crucial because it enhances the reaction rate between hydrogen and the minerals in the subterranean banded iron formation, such as magnetite, hematite, and pyrite. This temperature range helps optimize the reduction processes, making them more efficient and effective without causing unwanted side reactions or instability in the formation.

The hydrogen index (HI) is the ratio of hydrogen content of a sample to its organic carbon content. The HI value suggests the hydrogen release capacity for a formation, making it an effective source for hydrogen production when treated appropriately. This value is useful for evaluating the efficiency of the process and optimizing the conditions for maximum hydrogen extraction. HI function may indicate how much hydrogen is present per gram of material, with higher values generally signifying a higher hydrogen content and potentially greater reactivity or energy content.

In some embodiments, the subterranean banded iron formation with at least 50% by weight hematite and has a hydrogen index of 450 to 480 mg $H_2$/g, preferably at least 60% by weight hematite and has a hydrogen index of 460 to 490 mg $H_2$/g, preferably at least 65% by weight hematite and has a hydrogen index of 465 to 495 mg $H_2$/g, and more preferably at least 70% by weight hematite and has a hydrogen index of 500 to 510 mg $H_2$/g. In a preferred embodiment, the subterranean banded iron formation is at least 80% by weight hematite and has a hydrogen index of 520 to 530 mg $H_2$/g. In another preferred embodiment, the subterranean banded iron formation is at least 80% by weight hematite and has a hydrogen index of 740 to 770 mg $H_2$/g. In yet another preferred embodiment, the subterranean banded iron formation is at least 80% by weight hematite and has a hydrogen index of 670 to 690 mg $H_2$/g.

In some embodiments, the subterranean banded iron formation is at least 50% by weight magnetite and has a hydrogen index of 450 to 480 mg $H_2$/g, preferably at least 60% by weight magnetite and has a hydrogen index of 480 to 490 mg $H_2$/g, preferably at least 65% by weight magnetite and has a hydrogen index of 500 to 530 mg $H_2$/g, and more preferably at least 70% by weight magnetite and has a hydrogen index of 530 to 540 mg $H_2$/g. In a preferred embodiment, the subterranean banded iron formation is at least 80% by weight magnetite and has a hydrogen index of 540 to 550 mg $H_2$/g. In another preferred embodiment, the subterranean banded iron formation is at least 80% by weight magnetite and has a hydrogen index of 640 to 670 mg $H_2$/g.

In some embodiments, the subterranean banded iron formation is at least 50% by weight pyrite and has a hydrogen index of 340 to 380 mg $H_2$/g, preferably at least 60% by weight pyrite and has a hydrogen index of 360 to 390 mg $H_2$/g, preferably at least 65% by weight pyrite and has a hydrogen index of 465 to 495 mg $H_2$/g, and more preferably at least 70% by weight pyrite and has a hydrogen index of 500 to 510 mg $H_2$/g. In a preferred embodiment, the subterranean banded iron formation is at least 80% by weight pyrite and has a hydrogen index of 520 to 540 mg $H_2$/g. In another preferred embodiment, the subterranean banded iron formation is at least 80% by weight pyrite and has a hydrogen index of 355 to 370 mg $H_2$/g.

In some embodiments, the subterranean banded iron formation includes at least 50% by weight hematite and a binding energy of the hydrogen to the hematite is −8 to −5 kcal/mol, preferably at least 55% by weight hematite and a binding energy of the hydrogen to the hematite is −9 to −6 kcal/mol, preferably at least 65% by weight hematite and a binding energy of the hydrogen to the hematite is −10 to −7 kcal/mol, and more preferably at least 75% by weight hematite and a binding energy of the hydrogen to the hematite is −12 to −10 kcal/mol. In a preferred embodiment, the subterranean banded iron formation includes at least 80% by weight hematite and a binding energy of the hydrogen to the hematite is −13 to −11 kcal/mol. The negative binding energy indicates that hydrogen binds relatively strongly to the hematite, which is important for facilitating reactions like reduction or hydrogenation.

EXAMPLES

The following examples demonstrate an injection fluid for hydrogen storage in subterranean formation. The examples are provided solely for illustration and are not to be construed as limitations of the present disclosure, as many variations thereof are possible without departing from the spirit and scope of the present disclosure.

Example 1: Materials

The pyrite, magnetite and hematite samples used in the disclosure were purchased from Ward's Science, Rochester, NY. The makeup of the sample was determined using an X-ray diffraction (XRD) system by Malvern Panalytical, with the composition shown in Table 1. Salts used in the disclosure to prepare the brine solution (Table 2) are of American Chemical Society (ACS) reagent grade and included salts such as sodium chloride (NaCl), sodium bicarbonate (NaHCO$_3$), sodium sulfate (Na$_2$SO$_4$), magnesium chloride (MgCl$_2$), and calcium chloride (CaCl$_2$).

TABLE 1

Sample composition from XRD analysis.

| Mineral | Chemical Formula | Sample Composition (%) | | |
|---|---|---|---|---|
| | | Wt. % | Wt. % | Wt. % |
| Pyrite | FeS$_2$ | 82.3 | — | — |
| Magnetite | Fe$_3$O$_4$ | — | 69 | — |
| Hematite | Fe$_2$O$_3$ | — | — | 100 |
| Vermiculite | (Mg,Fe$^{2+}$,Fe$^{3+}$)$_3$[Al,Si)$_4$O$_{10}$] (OH)$_2$•4H$_2$O | — | 2.8 | — |
| Quartz | SiO$_2$ | 17.7 | 28.3 | — |

TABLE 2

Seawater composition.

| Ion | Concentration (ppm) |
|---|---|
| Na$^+$ | 18,300 |
| Ca$^{2+}$ | 650 |
| Mg$^{2+}$ | 2,110 |
| SO$_4^{2-}$ | 4,290 |
| Cl$^-$ | 32,200 |
| HCO$_3^-$ | 120 |
| TDS | 57,670 |

Example 2: Methodology

The samples used in the disclosure were ground into powder using a mortar and pestle to minimize the destruction of the crystals of the minerals. After the grinding process, the particle size distribution of the particles was determined. The samples have average particle size values of 7.03 micrometers (μm), 52.55 μm, and 27.72 μm, for pyrite, magnetite, and hematite, respectively. The hydrogen index (HI) of the original (crushed, unexposed to hydrogen) sample was determined before exposure to hydrogen gas to serve as the basis for comparison using Rock-Eval analysis (procedure explained in the following section). To expose the samples to hydrogen gas, the samples were placed in a Teflon cup (5 g sample) and placed inside the ageing cell. The cover of the ageing cells was then placed and fastened firmly. The cell is then vacuumed for 3 minutes to remove trapped air inside the ageing cell. Subsequently, hydrogen gas is introduced into the cell at a set pressure. The pressure inside the cell is monitored via a pressure gauge installed upstream of the cell. Once the pressure (1000 psi) is reached, the valve on the cell is locked. The assembly is then dismantled, and the cell is placed in an oven at a preset temperature of 80° C.

After 24 hours, the ageing cell is removed from the oven, and the pressure left inside the ageing cell is determined before opening the cell to release unabsorbed hydrogen gas. The solid samples are thereafter retrieved, and their hydrogen index is determined as in the case of the original samples. For each mineral in this disclosure, two cases were investigated. The case of hydrogen adsorption on dry samples is referred to as a dry case hereon, and the case of samples immersed in seawater (50 ml seawater with the composition shown in (Table 2) is referred to as a wet case. The disclosure unlike others as rightly pointed out recently [See: Zeng L, Sarmadivaleh M, Saeedi A, Chen Y, Zhong Z, Xie Q. *Storage integrity during underground hydrogen storage in depleted gas reservoirs*], has considered real iron-bearing minerals (presence of other minerals in sample make-up) other than pure minerals which have been used in the literature. Moreover, the impact of brine on the hydrogen interaction with the iron-bearing mineral was again studied in the present disclosure. The HI of both the dry and wet cases are determined and assessed in comparison to the original samples.

The effect of the adsorption capacity of the sample for hydrogen gas due to treatment with a chelating agent (ethylenediaminetetraacetic acid (EDTA)) is another evaluation which is reported in the disclosure. The experiment is repeated in cases of both dry and wet, with the corresponding HI determined for EDTA-treated samples. The HI is then used to assess the viability of hydrogen storage in the iron minerals.

Rock-Eval Analysis (Method of Hydrogen Adsorption Quantification)

The Rock-Eval 7 analyzer was utilized in the disclosure for the evaluation of the total organic carbon and total sulfur content of rocks, as well as the calculation of indexes like the hydrogen and oxygen indexes. However, the focus of the disclosure is on the evaluation of the hydrogen index, which is used to infer the amount of adsorbed hydrogen on the treated samples. The device has an alumina crucible, an oxidation temperature range of 200° C.-850° C., and pyrolysis temperatures of 40° C.-850° C., respectively. It includes flame ionization detectors (FID) and infrared detectors (IR), which are used to detect CO$_2$ and hydrocarbons, respectively. The Rock-Eval 7 is composed of two significant furnaces, one for oxidation and the other for pyrolysis. In a combustion oven connected to the pyrolysis furnace, a portion of the effluents undergo pyrolysis, where the sulfur compounds are converted to sulfur dioxide (SO$_2$). The FID and IR spectrometers are used to identify hydrocarbons and carbon monoxide/carbon dioxide (CO/CO$_2$), respectively, whereas the ultra-violet (UV) spectrometer is used to detect SO$_2$. After pyrolysis, the pyrolysis byproduct is oxidized in the oxidation furnace. The SO$_2$, CO, and CO$_2$ emissions are detected by UV and IR spectrometers, respectively. The adoption of a twin furnace design (pyrolysis and oxidation) is necessary to produce a long-lasting carbonaceous layer at the inner surface of the pyrolysis furnace. The coating prevents further adsorption and subsequent hydrocarbon loss that may affect hydrocarbon readings. The S1 and S2 peaks of the FID indicate that it is oxidized in single furnace machines. The superposition of the SO$_2$ and hydrocarbon signals allows us to distinguish between the organic sulfur, which is associated with the S1 and S2 peaks of the FID, and the pyritic sulfur. In the disclosure, the quantities of pyritic sulfur and organic sulfur are estimated using a mathematical model based on parameters produced from the Rock-Eval 7 analysis as published by Aboussou [See: Aboussou A. *New Rock-Eval method for Pyritic and Organic Sulphur quanti-* fication: Application to study organic matter preservation in Jurassic sediments]. Additionally, the kerogen technique of analysis was applied with a sample weight of 9 milligrams (mg) –14 mg, determined with a precision of 0.02 mg.

Example 3: Scanning Electron Microscope (SEM) Imaging

The change in the surface morphology of the samples due to exposure to hydrogen gas was investigated using a Gemini 550 scanning electron microscope (SEM). The SEM was fitted with an Aztec energy-dispersive X-ray spectrometer (EDX) and a backscattered electron (BSE) detector. To prepare the SEM samples, rectangular sample chips were cut and polished using smooth grit paper to get them ready for SEM imaging. The samples were subjected to hydrogen gas exposure in both wet (in the presence of brine) and dry (without brine) conditions, as well as with and without prior EDTA treatment. After the hydrogen gas exposure, the wet samples were dried at 40° C. for 24 hours before being used for imaging. Crucially, the SEM samples were kept under identical circumstances to the previously mentioned powdered samples, i.e., they were aged at the same temperature of 80° C. to mimic the same conditions. Following the ageing time, the samples were allowed to dry, mounted on stubs, and coated with 30 nm palladium-gold using a Quorum QR150R sputter coater before being subjected to SEM examination. The voltage and current used for the SEM analysis ranged from 2 kilovolt (kV) to 15 kV and 100 picoampere (pA) to 2000 pA, respectively.

Example 4: Density Functional Theory (DFT) Calculations

To provide insight into the hydrogen-iron mineral interactions that result in improved interaction or adsorption, density functional theory (DFT) calculations were performed. As implemented in Gaussian 16 [See: Frisch M J, Trucks G W, Schlegel H B, Scuseria G E, Robb M a., Cheeseman J R and other co-workers], all DFT computations were carried out at a B3LYP/6-311g(d, p) level of theory. Using the self-consistent reaction field of the polarizable continuum model (PCM-SCRF) [See: Tomasi J, Mennucci B, Cammi R. *Quantum mechanical continuum solvation models*], the calculations were performed implicitly in the solvent. To verify that the optimized structures are in a minimum energy state, frequency calculations are carried out. Using the same degree of theory as previously, the binding energies (counterpoise adjusted) from the intermolecular interaction of hydrogen and iron minerals are estimated, along with additional attributes such as the frontier molecular orbitals and electrostatic potential maps. Moreover, the Multiwfn program was used to analyze non-covalent interactions (NCI) and determine the type of interactions [See: Lu T, Chen F. Multiwfn: *A multifunctional wavefunction analyzer*]. Van der Waals interactions, steric clashes, and hydrogen bonds are a few interactions that may be observed and identified using NC. This may be achieved by plotting the reduced gradient s(r) vs $\rho$ (r) for low reduced gradient locations. More so the NCI analysis may be applied to affirm bond formation which is marked by a lack of peaks on the RDG maps.

Results and Discussion

Figure 2:
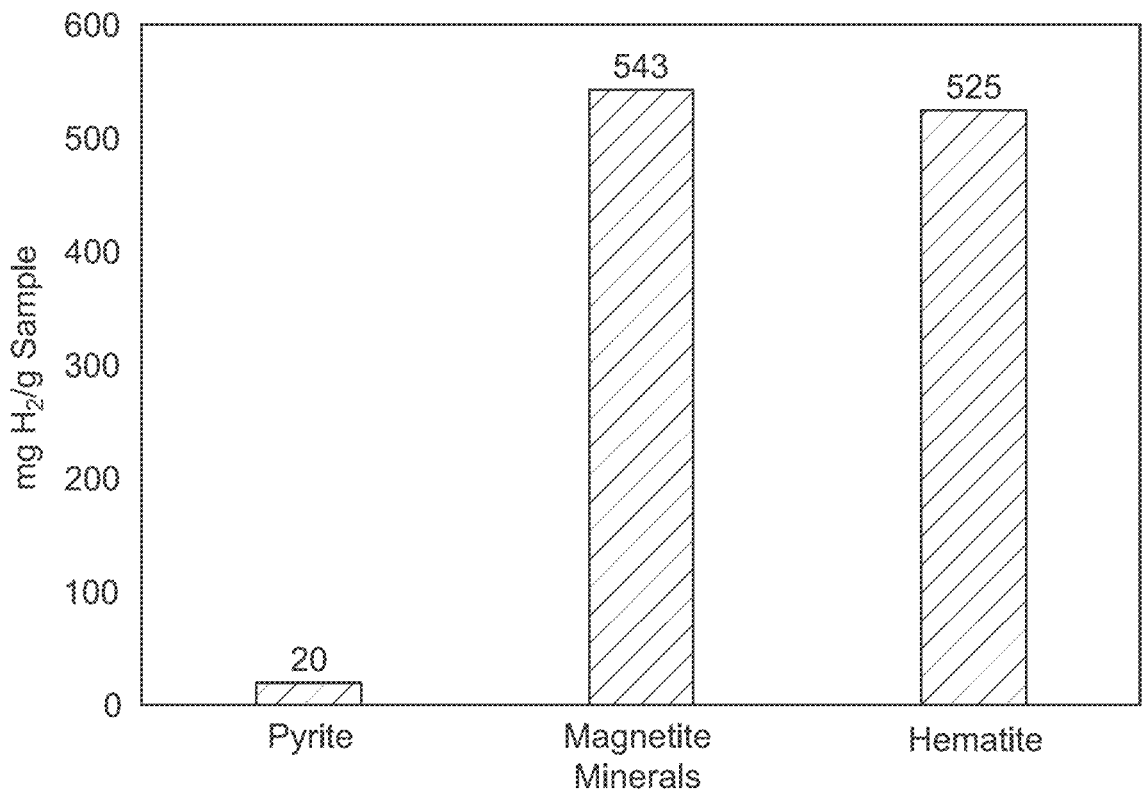
FIG. 2 depicts hydrogen index (HI) of intact samples, according to certain embodiments.

The purpose of the disclosure is to demonstrate how iron-mineral-rich formations are suited to store hydrogen gas. Specifically, to emphasize the process that may be used to store and extract hydrogen from such storage media. The hydrogen index determined by the Rock-Eval analysis is utilized to provide insights into the feasibility of hydrogen storage and extraction in iron minerals. The ratio of hydrogen content of the sample to its organic carbon content is called the hydrogen index. More precisely, it is the total hydrogen content in milligrams per gram of sample as determined by the S2 curve of Rock-Eval analysis. FIG. 2 displays the HI of the intact samples (as received). According to FIG. 2, magnetite has the highest HI, followed by hematite, and lastly pyrite. These are the samples in their natural state, unaltered by treatment or hydrogen exposure. This suggests that in their natural form, iron oxides like magnetite and hematite absorb hydrogen onto their surfaces. This may potentially be hydrogen in the form of water, since studies in the literature have demonstrated that iron oxides (hematite and magnetite) may react with water to produce hydrogen in wet settings. Consequently, the iron oxides have higher HI than that of pyrite. To explain the HI of pyrite in its native state, a study of the oxidation of pyrite in the presence of oxygen and water is studied [See: Dos Santos E C, de Mendonga Silva J C, Duarte H A. *Pyrite oxidation mechanism by oxygen in aqueous medium*]. The reports reveal that the oxidation of pyrite results in the transfer of electrons and formation of Fe (III) —OH⁻ species which may explain the HI found in the case of pyrite in its native state.

The impact of exposing iron minerals to hydrogen gas and treating them with a chelating agent to determine improvement in the amount of adsorbed hydrogen gas is discussed in the subsequent sections. The purpose of it is to determine whether the minerals may be employed on an industrial scale as primary hydrogen storage media. Another important aspect of hydrogen storage in formations rich in iron minerals is the retrieval of the stored gas.

Figure 3:
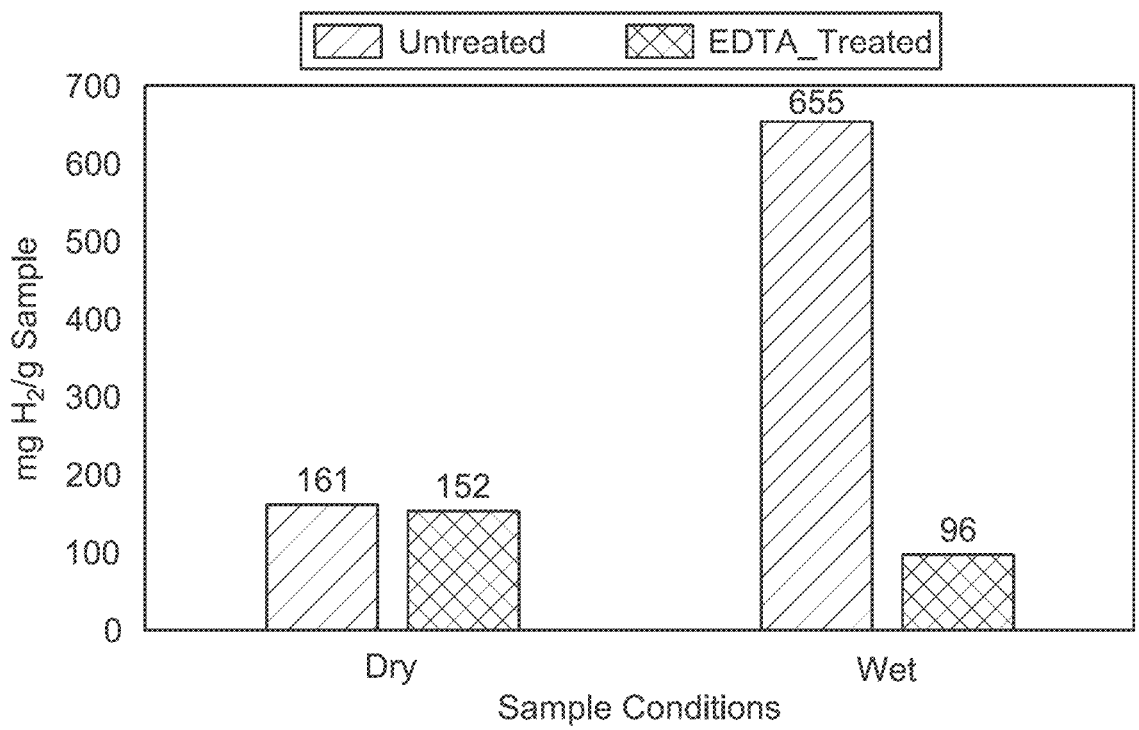
FIG. 3 depicts HI of magnetite sample in the cases of ethylenediaminetetraacetic acid (EDTA) untreated and treated samples as well as in dry and wet conditions, according to certain embodiments.

Magnetite mineral interaction with hydrogen in cases of dry and wet conditions, as well as with and without EDTA treatment, is depicted in FIG. 3. Although magnetite in its native state has shown a strong HI index and implies that it may adsorb hydrogen gas, the results shown in FIG. 3 share even more insightful results. Interestingly, before exposure to hydrogen in dry case conditions, magnetite displayed a high HI; however, upon interaction with hydrogen in the absence of water or brine, the number reduced significantly. Another fact to be noted is that with and without EDTA treatment, the HI remained roughly the same. Such observations may imply that the injection of hydrogen gas into the magnetite rock results in it becoming less hydrogen wet. The property is affirmed by further studies, and the present disclosure may investigate that hydrogen storage by bulk storage is possible in a magnetite-rich formation. Moreover, this property may mean less hydrogen is lost in the rock system.

On the other hand, in the wet experimental conditions where the magnetite particles are dispersed in brine before exposure to hydrogen, higher HI (higher than the native state) is observed. Compared to the native state and the dry conditions, the increase in the HI is by 20.6% and 306%, respectively. This means that some hydrogen, either from the brine or the hydrogen gas, had adsorbed on the magnetite surface. This is not surprising as the magnetite oxygen binding property has been reported to enable the formation of iron hydroxide aggregates [See: Evgenia-Maria P. *Retention of toxic pollutants by nanomagnetite aggregates*]. Thus, in a moist environment (presence of brine), it should be able to imbibe water to itself. Recently, the use of magnetite for the natural production of hydrogen gas has been re-evaluated [See: Geymond U, Briolet T, Combaudon V, Sissmann O, Martinez I, Duttine M, et al. *Reassessing the role of magnetite during natural hydrogen generation*]. With a focus on magnetite, the authors assessed the hydrogen production from the banded iron formations. The authors noted that hydrogen generation and the conversion of magnetite to maghemite (Eq.1) occurred at temperatures below 200° C. Consequently, the path indicated in Eq. 2 allowed for the production of hydrogen. Experimental results demonstrated the transition, with water being identified as the oxidizing agent. Thus, aside from the ability of magnetite to produce hydrogen by its interaction with water, it may adsorb hydrogen. However, the increase in the HI is not due to the production of hydrogen from Eq.2 because the temperature conditions in these experiments (80° C.) are lower than the reported temperature (180° C.-200° C.) at which the interactions should occur, as shown in FIG. 3. Thus, the increase in the HI is due to the adsorption of the hydrogen gas by the mineral, as shown in FIG. 3. This demonstrates that magnetite may hold hydrogen on its surface for hydrogen storage purposes. More important than the hydrogen storing capability of the mineral, is the ability to retrieve the stored hydrogen at times it is needed. FIG. 3 shows that upon the treatment of the magnetite sample with EDTA solution, the HI is significantly reduced by 85%. This appears to be the protocol that may be followed to release the stored hydrogen on the magnetite surface. In the present disclosure, it may be deduced that the magnetite mineral system may be used for storing hydrogen by injecting brine before hydrogen gas injection. However, to release the stored gas from the rock surface, EDTA solution or chelating agent solution may be injected. Thus, a protocol for the storage of hydrogen gas and its retrieval is proposed.

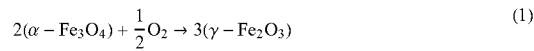

$$2(\alpha - Fe_3O_4) + \frac{1}{2}O_2 \rightarrow 3(\gamma - Fe_2O_3) \tag{1}$$

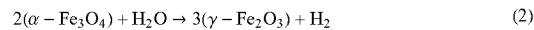

$$2(\alpha - Fe_3O_4) + H_2O \rightarrow 3(\gamma - Fe_2O_3) + H_2 \tag{2}$$

Figure 4:
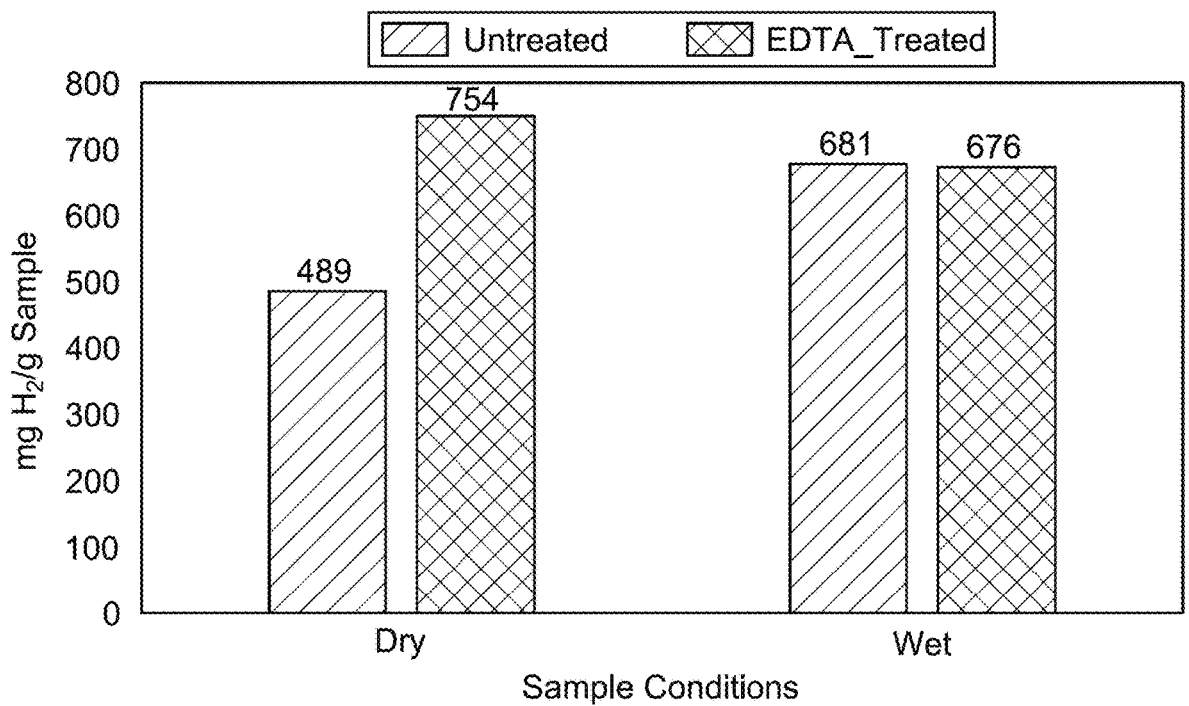
FIG. 4 depicts HI of hematite sample in the cases of EDTA untreated and treated samples as well as in dry and wet conditions, according to certain embodiments.

Like magnetite, hematite is an iron oxide mineral with a composition like that of magnetite except for the oxidation state of the iron element. Like magnetite, the native state of hematite mineral has a high HI value, almost comparable to that of magnetite. This is not surprising as in many cases, these minerals share reaction routes. However, its behavior differs significantly from that of magnetite when exposed to hydrogen gas. Unlike the case of magnetite where a significant decrease in the HI was recorded in the dry instances, a less drastic reduction is observed in the case of the untreated sample with an HI of 489 compared to the native state with 525, as shown in FIG. 4. In the case of hematite, treatment with EDTA in the dry instance showed a good increase in HI even much higher than those of magnetite in wet conditions. It implies that in a dry environment, such as reservoirs with no brine or oil in places, injection of EDTA into the formation before hydrogen gas injection may serve as a good storage medium. In the wet conditions, no significant difference between the EDTA-treated hematite and the untreated is observed. Thus, in both instances of wet conditions, higher HI than the native state is recorded. Thus, hydrogen adsorption on hematite occurs in dry cases upon EDTA treatment and in all wet instances.

Figure 5:
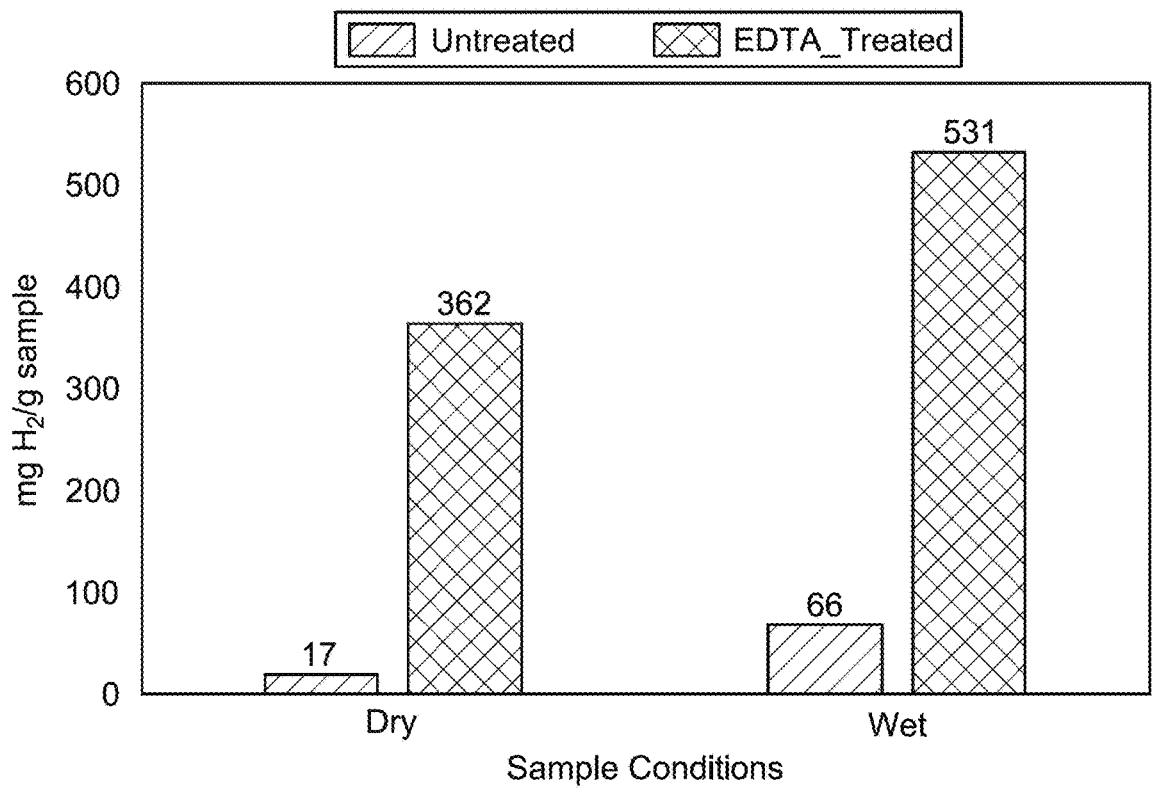
FIG. 5 depicts HI of pyrite sample in the cases of EDTA untreated and treated samples as well as in dry and wet conditions, according to certain embodiments.

Pyrite mineral interaction with hydrogen in both cases of wet and dry conditions, as well as with and without EDTA treatment, is discussed herein. The results of the HI evaluation are shown in FIG. 5. Compared to the native pyrite sample HI, which was recorded to be 20 milligram per gram (mg/g)-sample (see FIG. 2 above), the values shown in FIG. 5 are different. In the dry sample condition (i.e., in the absence of brine), the untreated sample interaction with hydrogen resulted in a 15% (3 mg/g-sample) reduction in pyrites HI compared to the native state. It may be attributed to the formation of hydrogen sulfide which was markedly recognized when the cells were open by its foul smell. It agrees with the literature [See: Zheng Z, You Y, Guo J, Li G, You Z, Lv X. *Pyrolysis behavior of pyrite under a CO—$H_2$ atmosphere*] as such interactions have been reported close to the temperature values of the investigation. Furthermore, the interaction of pyrite with hydrogen and the formation of hydrogen sulfide ($H_2S$) has been reported [See: Zheng Z, You Y, Guo J, Li G, You Z, Lv X. *Pyrolysis behavior of pyrite under a CO—$H_2$ atmosphere*] to continue till 580° C. after which the decomposition of $H_2S$ begins into $H_2$ and $S_2$. In the same dry conditions, sample treatment with EDTA before exposure to $H_2$ increases the HI of the pyrite mineral. It implies that pyrite sample treatment with EDTA improves its hydrogen adsorption capacity. Comparing this value with the native pyrite and the untreated sample, both at dry conditions, EDTA treatment increases the HI of both samples by 18 and 21-fold, respectively. This implies that hydrogen storage in iron-banded formations rich in pyrite may be achieved by treating the formation with EDTA before $H_2$ injection for storage.

Dry conditions are not the case in oil and gas reservoirs, which have been stated to be an option when it comes to storage site selection. More so, depleted reservoirs are good candidates since the infrastructure required to inject gases into the reservoirs is already in place. Additionally, present in the reservoirs are brines which were the first occupants of the pore spaces before the drainage process which replaces the water with either oil or gas. In reservoirs, where waterflooding has taken place, may have a significant amount of brine in place thus, the impact of the presence of brine on the adsorption of hydrogen on the pyrite mineral is investigated. The presence of brine is observed to increase the HI of the pyrite sample in both cases of untreated and treated samples. Thus, it is a significant advantage as most reservoirs have brine presence. In the case of the untreated sample, the recorded HI is 66 mg/g-sample compared to 17 and 20 in the cases of dry and native samples, respectively.

Figure 6:
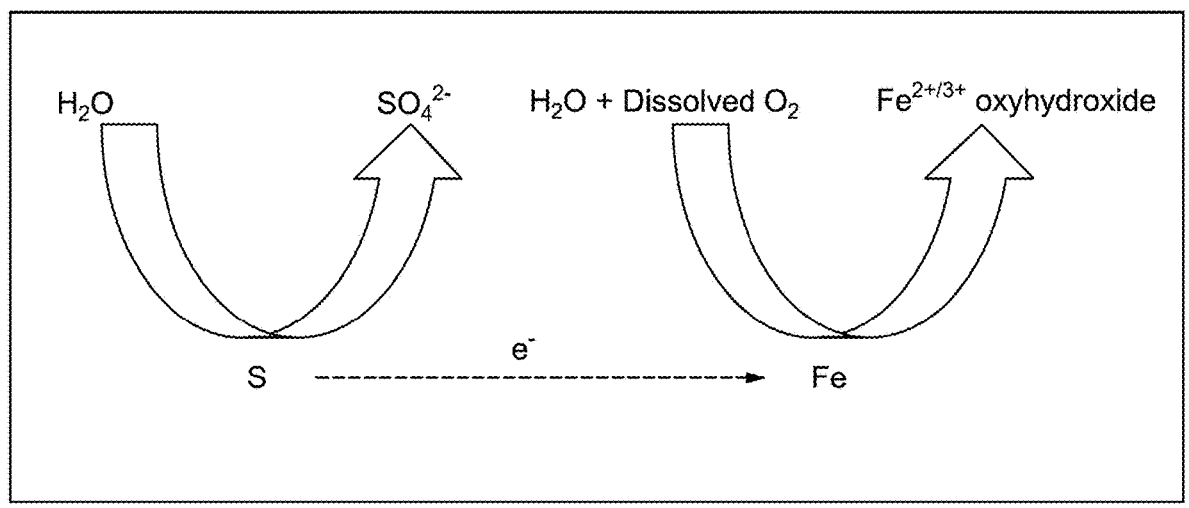
FIG. 6 depicts schematic illustration of pyrite-water interaction, according to certain embodiments.

The interaction of pyrite mineral in brine with $H_2$ may result in the formation of sulfate and iron oxyhydroxide as shown in FIG. 6 [See: Usher C R, Cleveland, CA, Strongin D R, Schoonen M A. *Origin of oxygen in sulfate during pyrite oxidation with water and dissolved oxygen*]. This is the case as the formation of sulfate is expected to reduce the brine pH. Interestingly, the pH measurement after the reaction time showed that the pH had reduced from an initial value of 8.35 to 4.09. Thus, confirming reaction route inference which agrees with the literature [See: Usher C R, Cleveland, CA, Strongin D R, Schoonen M A. *Origin of oxygen in sulfate during pyrite oxidation with water and dissolved oxygen*]. If this were the case, the oxygen-bearing component in the system may interact with the $H_2$ via hydrogen bond formation, thus, a plausible reason for the increase in HI in the cases of the wet conditions. Interestingly, the treatment of the sample with EDTA increased the HI by almost 2-fold compared to the dry case, which had an HI of 362 mg/g-sample. From the HI evaluation conducted in the case of pyrite, $H_2$ storage in a pyrite-rich system may be said to be feasible due to the ability of pyrite mineral to hold $H_2$ on its surface. This is the case in both dry systems, where brine or water does not exist in the formation, and in cases where brine exists; however, the storage capability is confirmed only after the pyrite rock has been treated with a chelating agent shown in the disclosure. Furthermore, to understand how strong the interaction is with the pyrite surface, the section on DFT calculations may provide further insights.

Although the discussion thus far has shown that the pyrite mineral may serve as a storage media for $H_2$, its retrieval from the pyrite surface is the next subject of discussion. This is because, after storage for a certain period, the stored $H_2$ may need to be produced back for usage. The observed HI of the pyrite system has shown pyrite to be a good $H_2$ storage medium.

This portion of the study assesses how $H_2$ interacts with iron minerals affects the structural integrity (permeability and hardness) of the sample. This is important because excellent structural integrity is required for the iron-banded formation-which is regarded to have the potential for storing hydrogen gas in terms of a viable storage option. Furthermore, it is important that oil and gas reservoirs-particularly the depleted ones designated as possible storage locations—be able to tolerate such kinds of interactions. The pyrite and magnetite samples are among those examined in this section. As in the previously stated adsorption investigations, such samples are aged and exposed to hydrogen gas at 1000 psi in both dry and wet conditions. The hardness and permeability of the iron minerals were evaluated following a 24-hour exposure to $H_2$ to evaluate the structural integrity of the minerals. Furthermore, the degree of variation in the attributes (permeability and hardness) before and after treatment is examined by reporting the changes in percentages. It is critical to note that the untreated samples received the same temperature and duration of treatment as the samples that were exposed to $H_2$. This may guarantee a fair comparison.

Figure 7A:
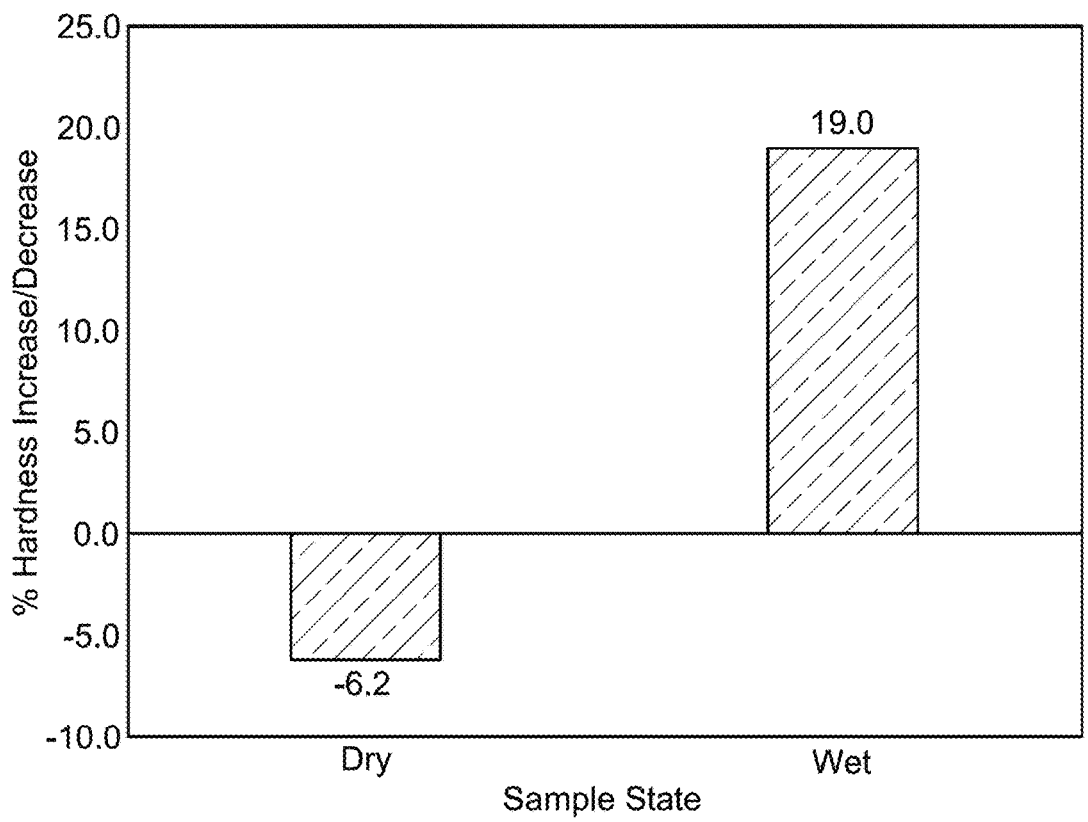
FIG. 7A depicts sample hardness in the case of pyrite, according to certain embodiments.

The hardness of the pyrite sample and magnetite samples is shown in FIG. 7. In the case of pyrite, as shown in FIG. 7A, the hardness is observed to decrease by 6.2% in the dry state as compared to the observed increase (19%) in hardness in the wet case. This implies that in the dry condition, hydrogen gas interaction with the pyrite samples reduces its hardness. However, in the presence of brine, the reverse is observed leading to an increase of 19% in hardness. To understand the implications of the values, the HI of the treated samples in the case of pyrite was observed, as shown in FIG. 2 and. From the three figures, it may be observed that the interaction of $H_2$ with pyrite in dry conditions showed a reduction in the HI from a value of 20 to 17, as shown in FIG. 5. In the wet conditions (in the presence of brine), an increase in the HI index value to a value of 66 is observed, as shown in FIG. 5. This shows a direct correlation with the observed hardness, as shown in FIG. 7A. thus, from the HI and the measured hardness of the pyrite sample, it may be observed that a direct correlation exists. Thus, an increase in the adsorption of $H_2$ on the pyrite surface results in sample hardness. Whereas a decrease in adsorption reduces the sample hardness. This has important implications in that the storage of iron in iron-rich reservoirs in the presence of brine may improve the structural integrity of the formations.

Figure 7B:
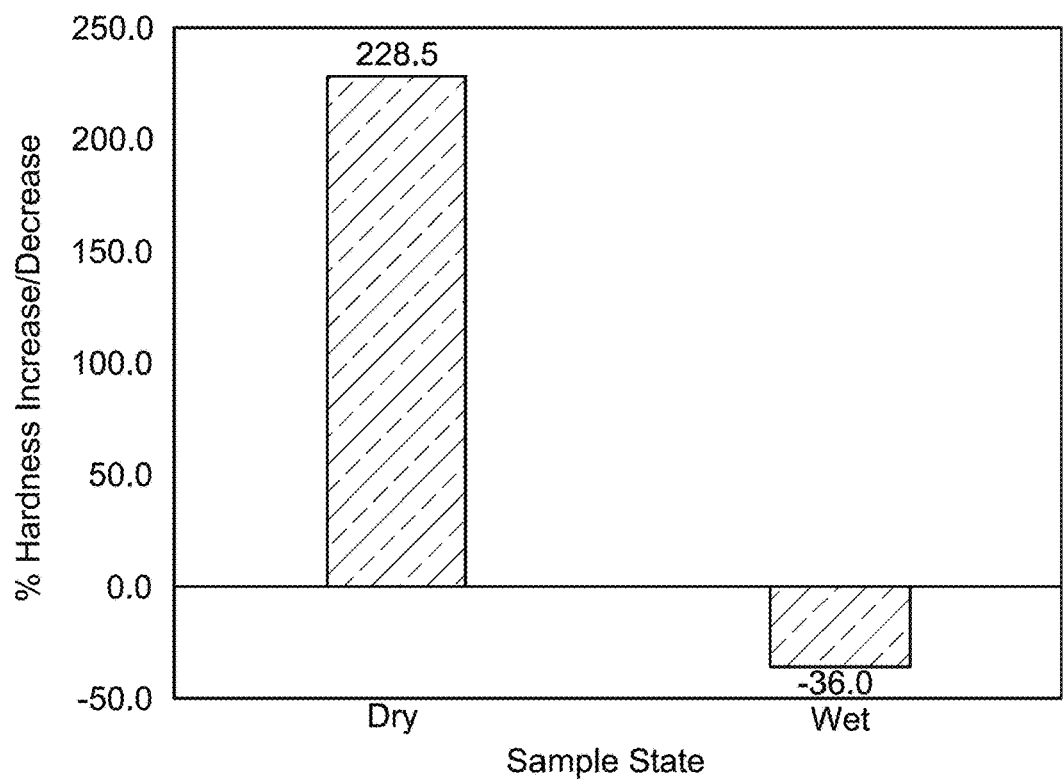
FIG. 7B depicts sample hardness in the case of magnetite, according to certain embodiments.

In the case of the magnetite sample, as shown in FIG. 7B, the observation is opposite that of pyrite, as shown in FIG. 7A. In the case of magnetite, in dry conditions (interaction of $H_2$ with magnetite in the absence of brine), an increase in the sample hardness (228.5) is recorded. Whereas, in the presence of brine, a decrease of 36% is observed. Both instances have significant implications for field operations. Firstly, in the mining sites, due to the brittle and ductile nature of the banded iron formations (BIF), collapses in the mining site are a big concern for the safety of the miners [See: Mohamed K. El-Shafei M K E-S. *Structural control on banded iron formation (bif) and gold mineralization at Abu Marawat Area, Central Eastern Desert, Egypt. Journal of King Abdulaziz University Earth Sciences*]. Thus, from the results, it may be implied that injecting $H_2$ into the BIF rich with iron oxides, such as magnetite, may significantly improve its hardness. In the wet conditions, which is the case of $H_2$ interaction in the presence of brine, a lesser increase in hardness is observed. Interestingly, a correlation with the HI of the magnetite sample may be established however, it is unlike the case of pyrite where a direct relation was seen. In the case of magnetite, an increase in the HI correlates to a decrease in the sample hardness. This may be observed in FIGS. 2 and 7B.

Figure 8A:
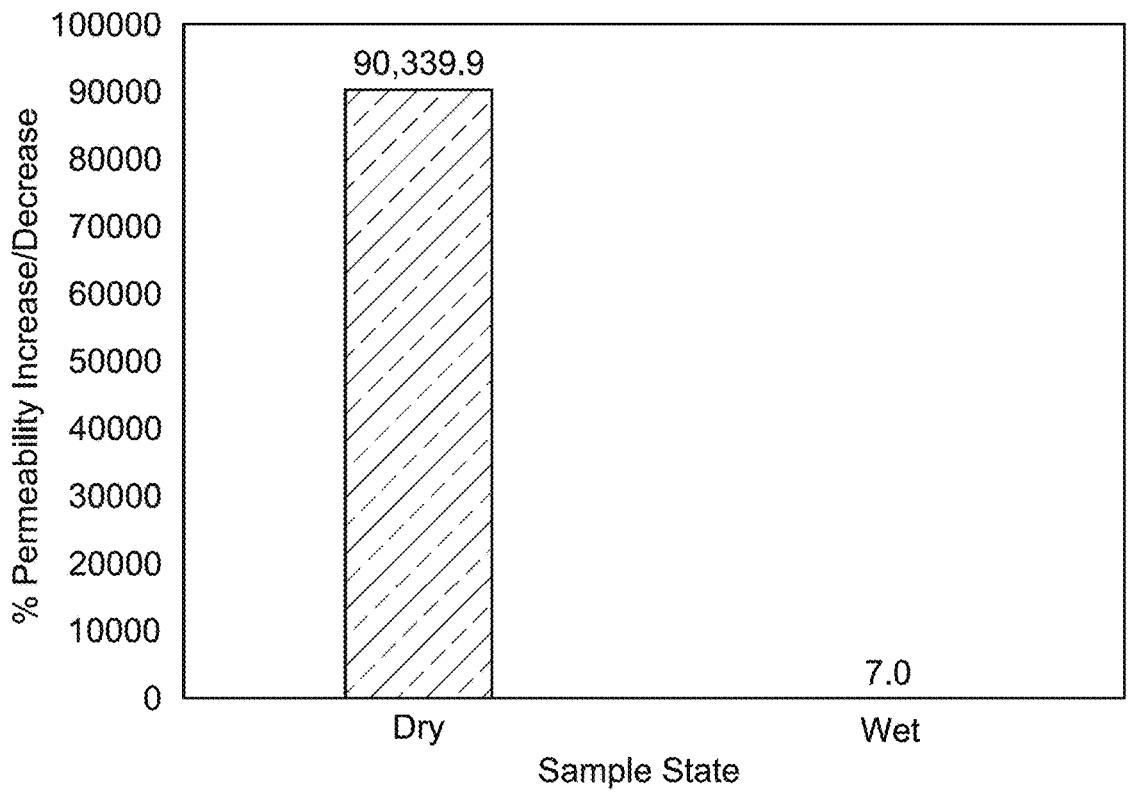
FIG. 8A depicts sample permeability in the case of pyrite, according to certain embodiments.
Figure 8B:
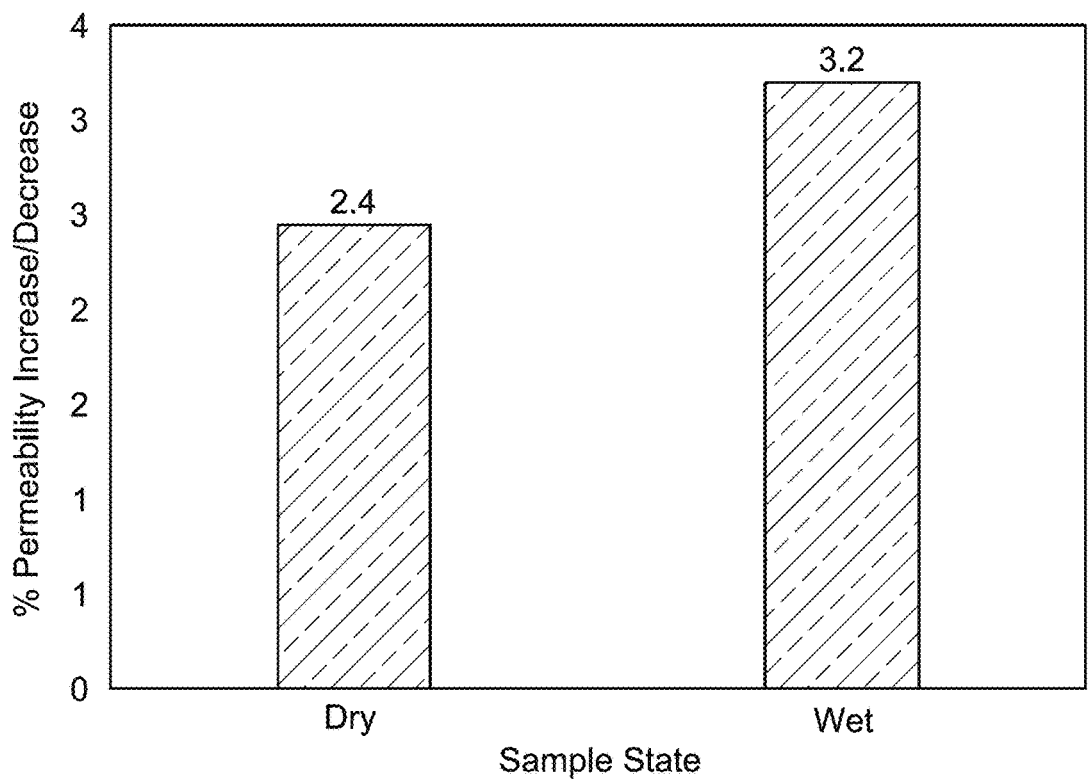
FIG. 8B depicts sample permeability in the case of magnetite, according to certain embodiments.

Just as the sample hardness was analyzed, sample permeability was measured. The results of permeability measurements of the treated samples compared to the untreated samples are shown in FIG. 8. In the case of pyrite, regardless of the sample state, permeability improvement was recorded, as shown in FIG. 8A. However, an immense improvement in permeability was observed in the case of dry conditions. Thus, treating the pyrite sample, with hydrogen increases the sample permeability by over 90,000%. More so, it has a significant implication for different field applications. First, in the oil and gas wells where the pyrite scale is still a major flow assurance concern, injection of $H_2$ may be good and make the pyrite scale more porous than the reservoir itself thus, restoring the impaired permeability. This creates such a flow path to allow the easy flow of chelating agents, which are used to remove such scale. Furthermore, it may significantly reduce the required concentration and volume of chelating agent required to remediate pyrite scale concerns. In the case of magnetite, a much lesser increase in permeability (2.4% and 3.2%) is observed in the dry and wet conditions respectively, as shown in FIG. 8B. Thus, as pyrite, regardless of the sample state, the treatment of iron minerals with $H_2$ results in a permeability increase.

Figure 9A:
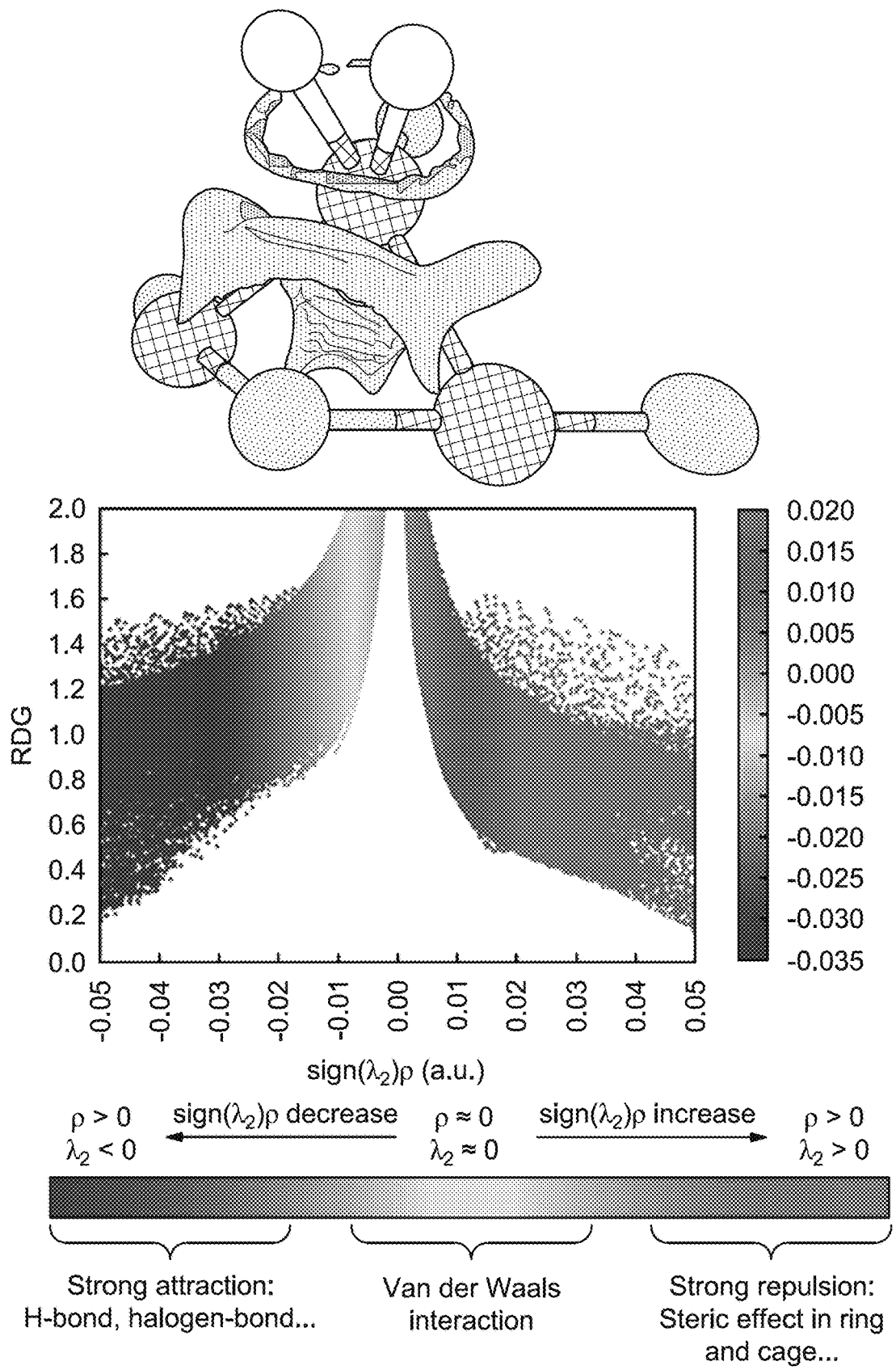
FIG. 9A depicts a non-covalent interaction (NCI) and a reduced density gradient (RDG) scatter plots showing interactions between magnetite and hydrogen, according to certain embodiments.
Figure 9B:
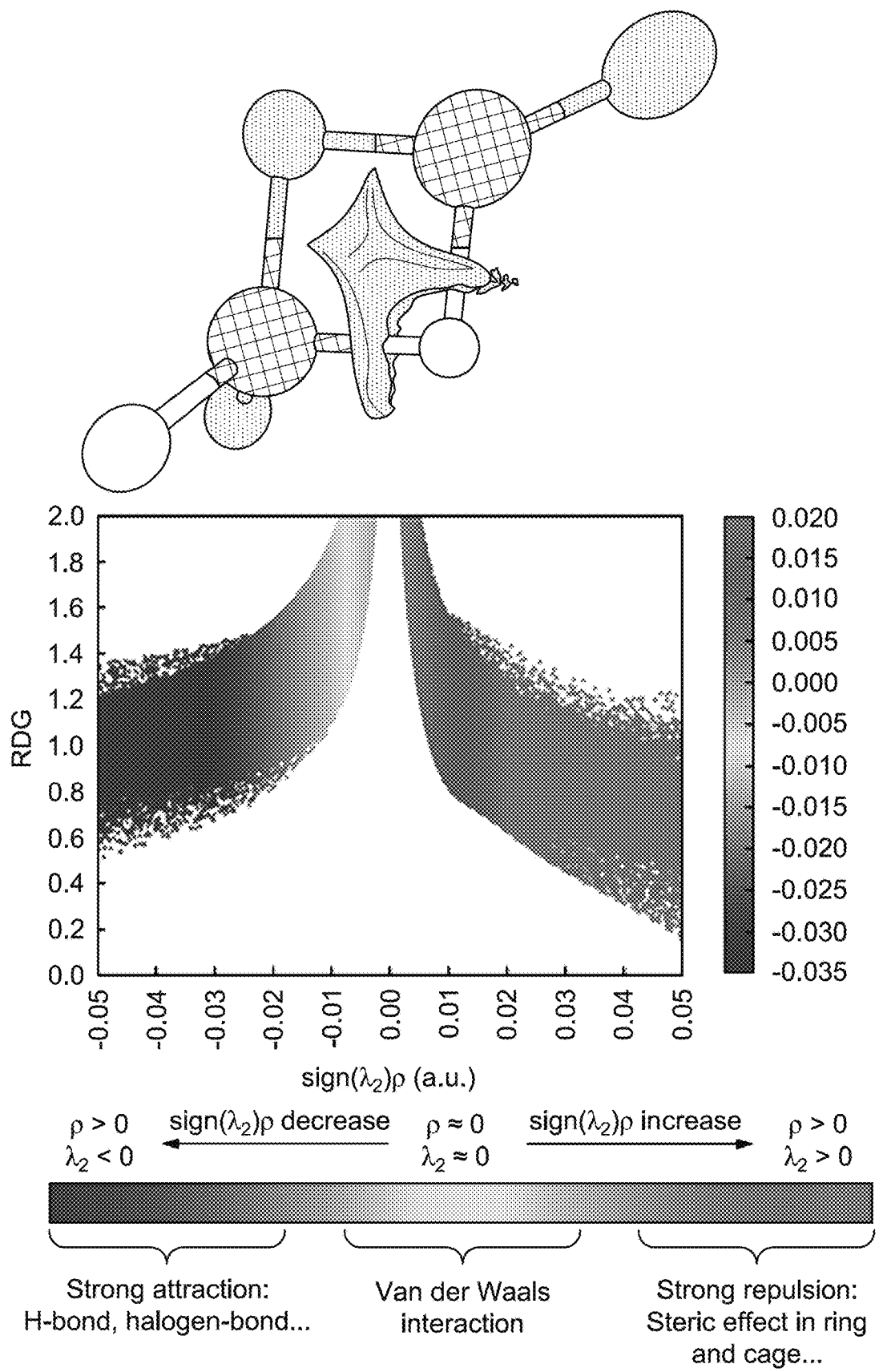
FIG. 9B depicts an NCI and a RDG scatter plots showing interactions between hematite and hydrogen, according to certain embodiments.
Figure 9C:
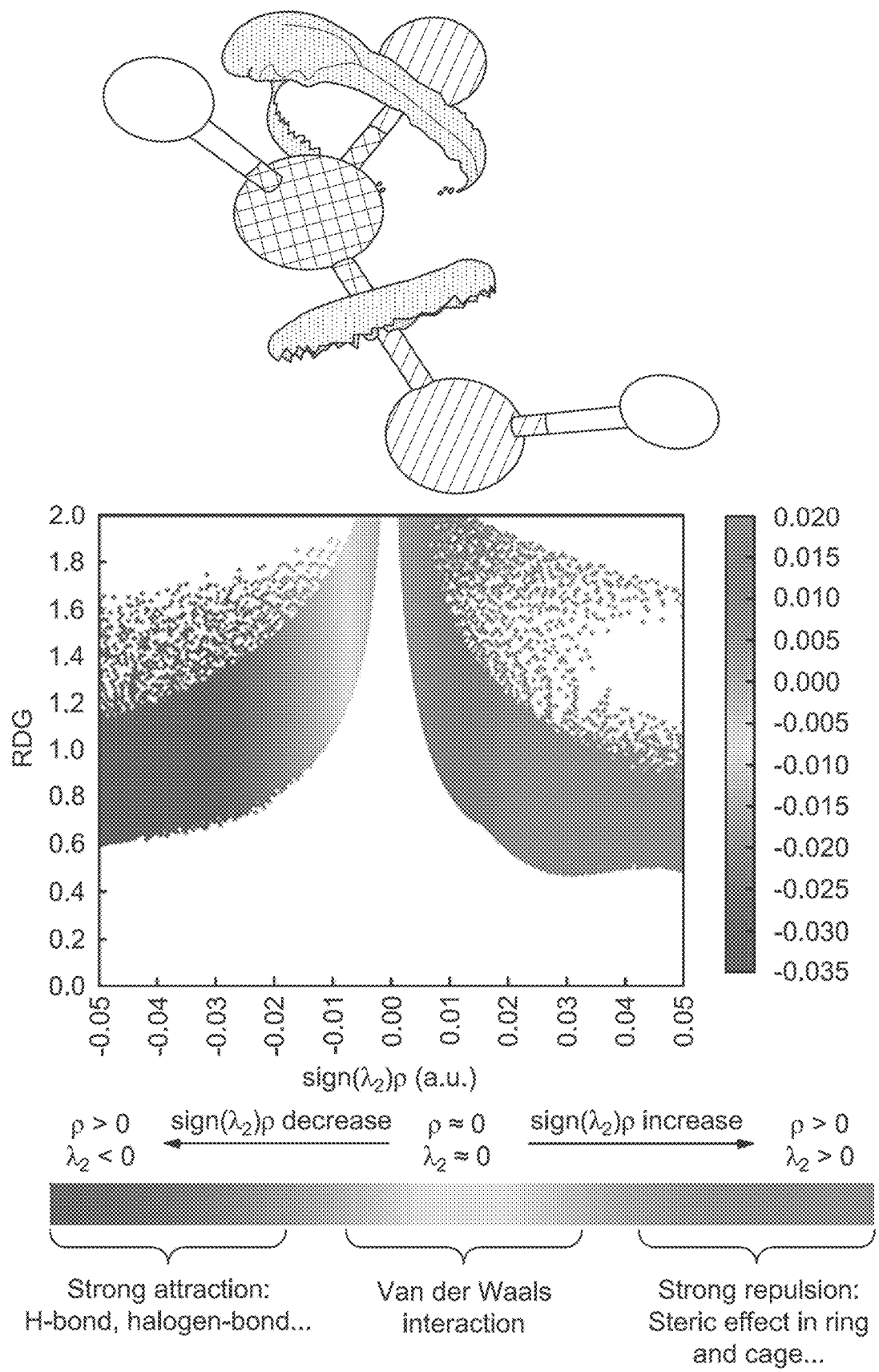
FIG. 9C depicts an NCI and a RDG scatter plots showing interactions between pyrite and hydrogen, according to certain embodiments.

The DFT calculations provided in this disclosure utilized a simple molecular representation of each mineral to interact with a single molecule of hydrogen to establish the degree of interaction and the nature of the interaction. Table 3 and FIGS. 9A-9C show the binding energy of interaction of the mineral with hydrogen, and the NCI analysis results show the type of interactions. From the binding energy values, negative values imply that the interaction is thermodynamically favored, whereas positive values mean otherwise. More so, a positive binding energy implies that the interaction requires energy for such interaction to take place. From the results, the most thermodynamically favored interaction with hydrogen is that of hematite, followed by pyrite and the least is with magnetite. However, if energy which may be in the form of pressure, temperature etc. may be provided, magnetite may dominate interactions with hydrogen. Given that the calculations were performed in the absence of water, the binding energies may be compared to the results of HI in the dry condition. Correlation is observed between the percentage reduction of HI between the dry state (without treatment) compared to the native state and the binding energy. It may be observed that hematite-$H_2$ which has the highest binding energy has the lowest percentage reduction of HI (6.86%) compared to its HI in its native state and the dry state. This is followed by pyrite which has a percentage reduction of 15% and lastly, the least is the case of magnetite with a 70.35% reduction in HI. Thus, it may be inferred that the binding affinity of hydrogen to this mineral is in direct correlation to the reduction in their HI upon exposure to hydrogen in dry cases. More so, NCI analysis in the systems showed that the hydrogen is covalently bonded to all the minerals. This is even further validated by the reduced density gradient (RDG) map that shows no peak characteristics of interaction as no bond been formed. Thus, from the DFT calculations, hydrogen atoms may strongly be adsorbed on the surfaces of this mineral by bond formation and the retrieval of the bonded hydrogen may be done by chemical means, thus, the use of chelating agents has been discussed in the disclosure. Although this is a simple calculation to demonstrate the interaction between the minerals and hydrogen, a more robust and detailed MD simulation is to be provided to establish an understanding of iron mineral-hydrogen interactions.

TABLE 3

Mineral-$H_2$ interaction energies.

| Pairs | Binding Energy (kcal/mol) |
| --- | --- |
| Pyrite-$H_2$ | −5.74 |
| Magnetite-$H_2$ | 20.98 |
| Hematite-$H_2$ | −11.69 |

Figure 10A:
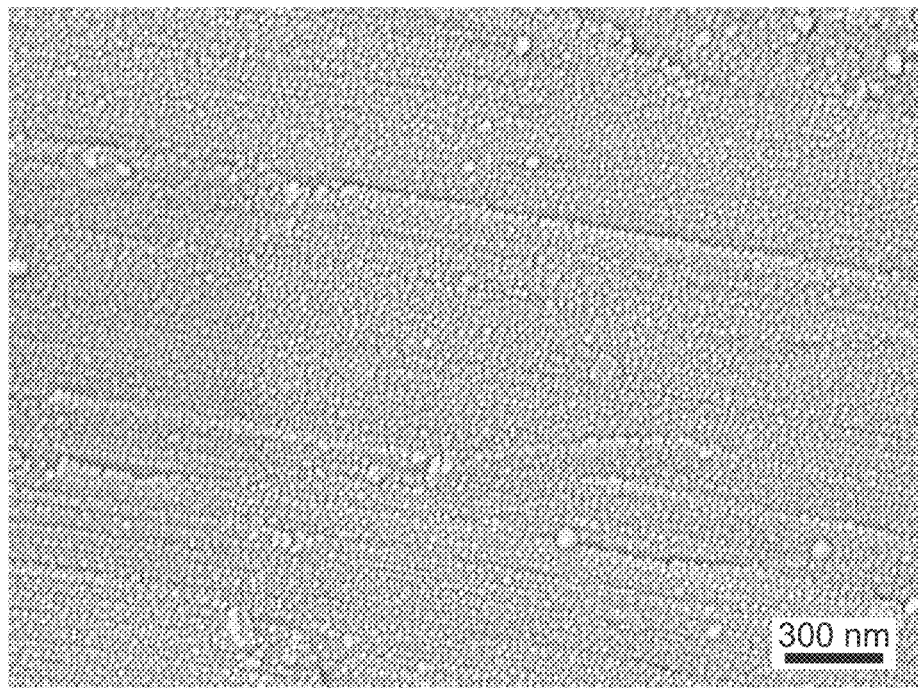
FIG. 10A depicts scanning electron microscopy (SEM) image of intact magnetite, according to certain embodiments.
Figure 10B:
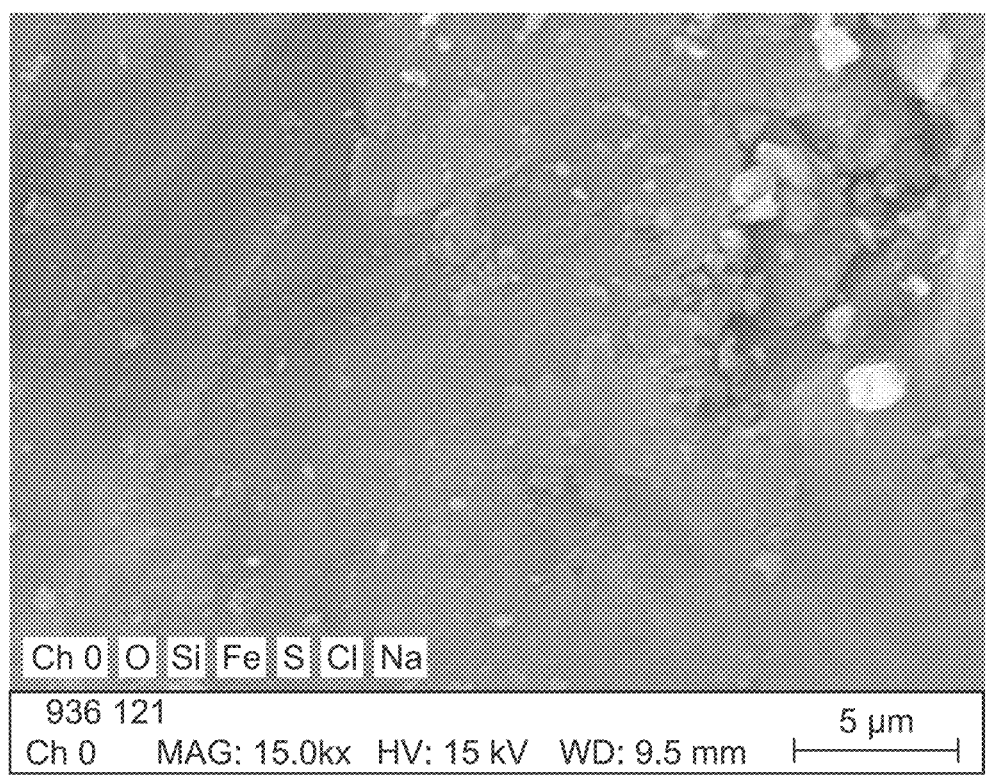
FIG. 10B depicts energy-dispersive X-ray spectrometer (EXD) analysis of intact magnetite, according to certain embodiments.

SEM image analysis presented herein is to examine the change in the surface properties of the samples exposed to hydrogen gas in both dry and wet conditions, as well as evaluate the effect of EDTA treatment on the sample surface. In this section, only the pyrite and magnetite samples were examined due to the availability of solid samples of the minerals. More so, although the iron oxide minerals may slightly differ in the manner they interact with hydrogen, their behavior should be similar. Thus, observations discussed in the following paragraphs in the case of magnetite may apply to hematite. The SEM image of the intact or unexposed magnetite in its natural form as received from the supplier is shown in FIG. 10. FIG. 10A shows the surface is dominated by dot-like spots which may be hydrogen bonding sites. This may not be apparent from this image but may become clear with other images. The EDX analysis, as shown in FIG. 10B, depicted that the samples are made of Fe, $O_2$ and Si, which agrees with the XRD data presented in Table 1. A close look at the image, as shown in FIG. 10A, depicted the spots are quite high in number and cover the whole sample, thus, if the spots represent the hydrogen binding sites on the mineral surface, this explains the high HI observed in the native samples of both magnetite and hematite samples, as shown in FIG. 2.

Figure 11A:
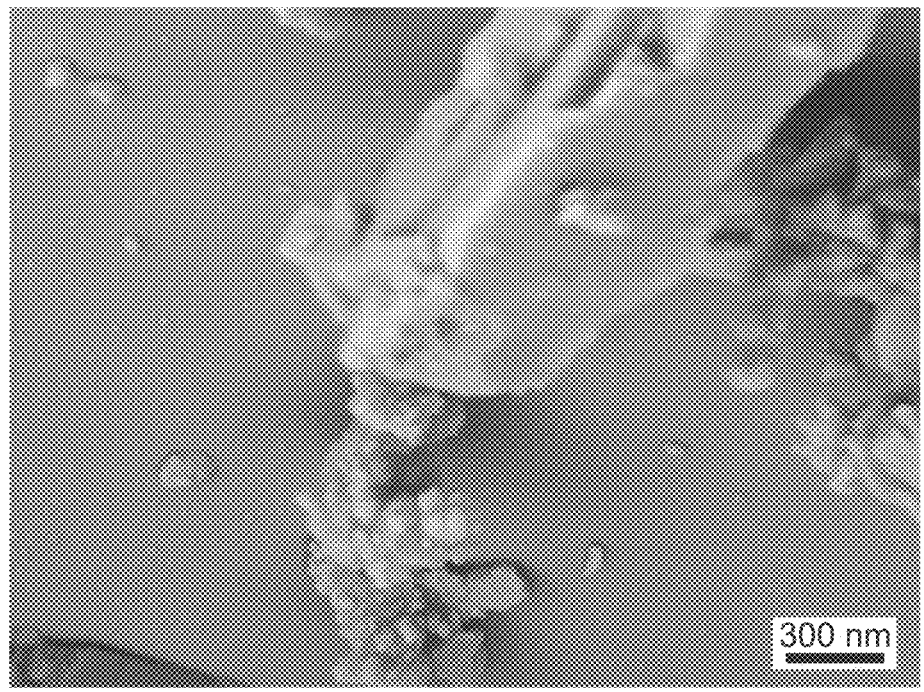
FIG. 11A depicts SEM images of magnetite sample in dry condition without EDTA, according to certain embodiments.
Figure 11B:
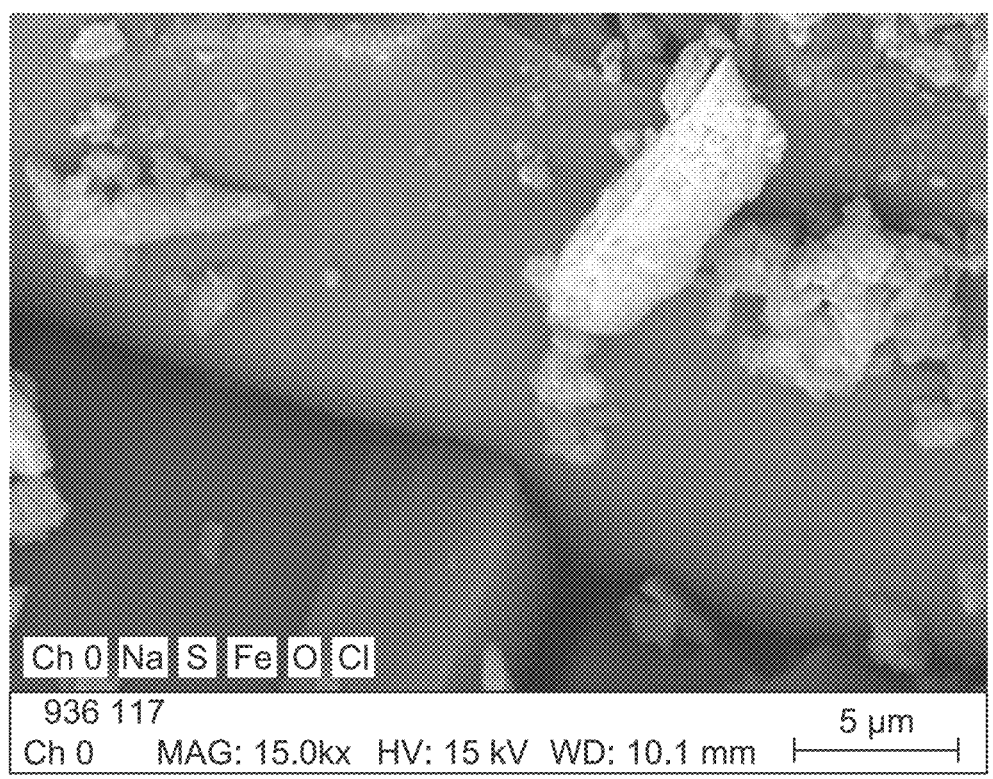
FIG. 11B depicts EDX analysis of magnetite sample in dry condition without EDTA, according to certain embodiments.
Figure 11C:
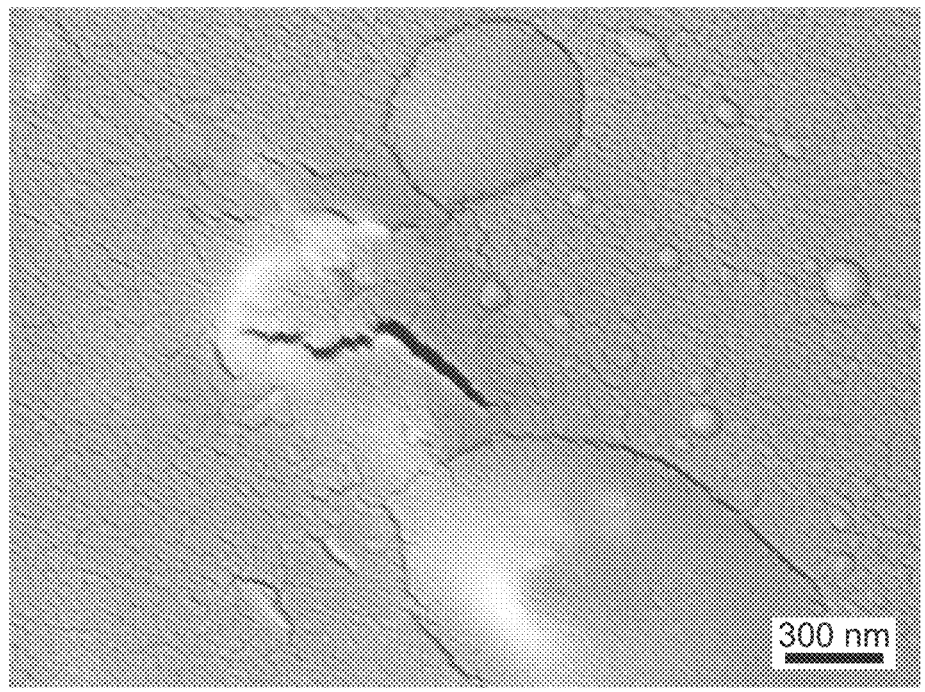
FIG. 11C depicts SEM images of magnetite sample in dry condition with EDTA, according to certain embodiments.
Figure 11D:
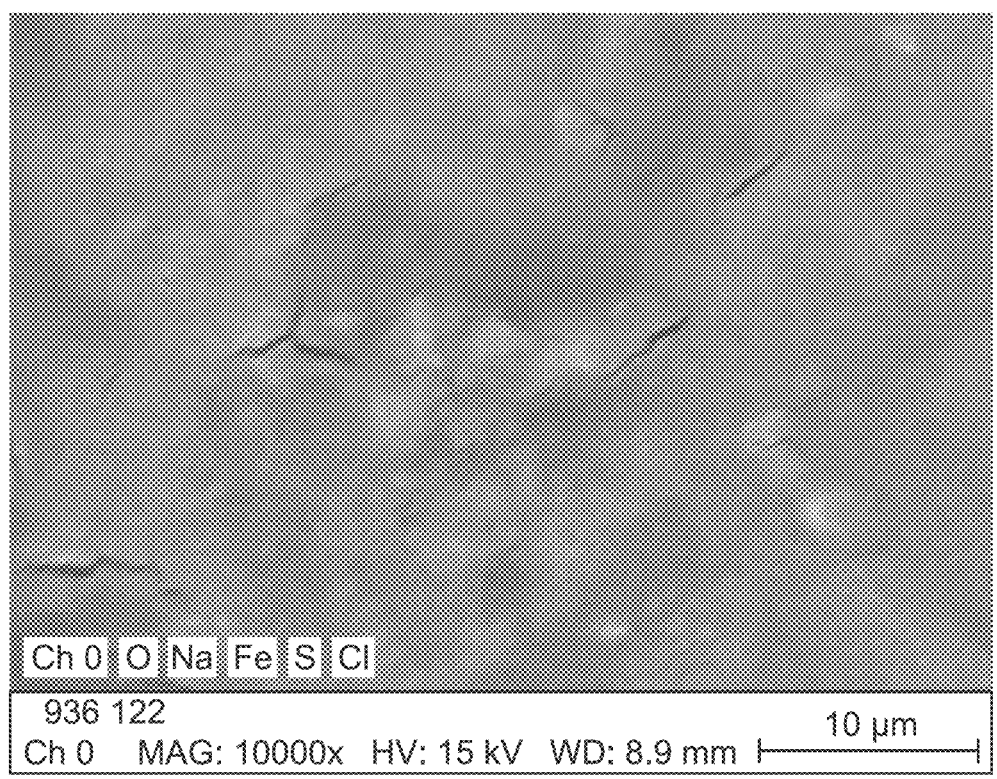
FIG. 11D depicts EDX analysis of magnetite sample in dry condition with EDTA, according to certain embodiments.
Figure 12A:
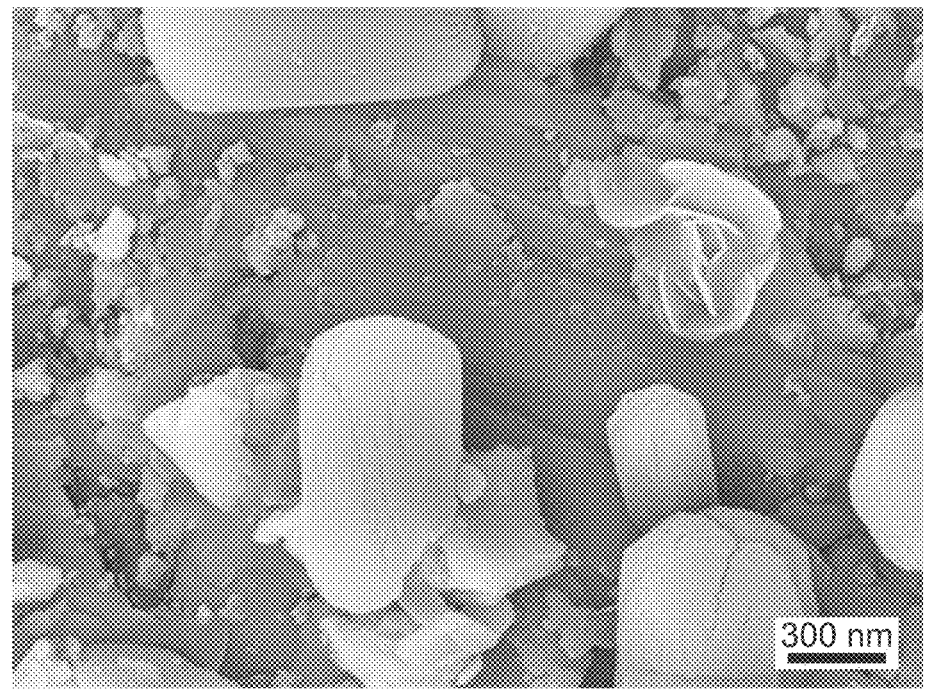
FIG. 12A depicts SEM images of magnetite sample in wet condition without EDTA, according to certain embodiments.
Figure 12B:
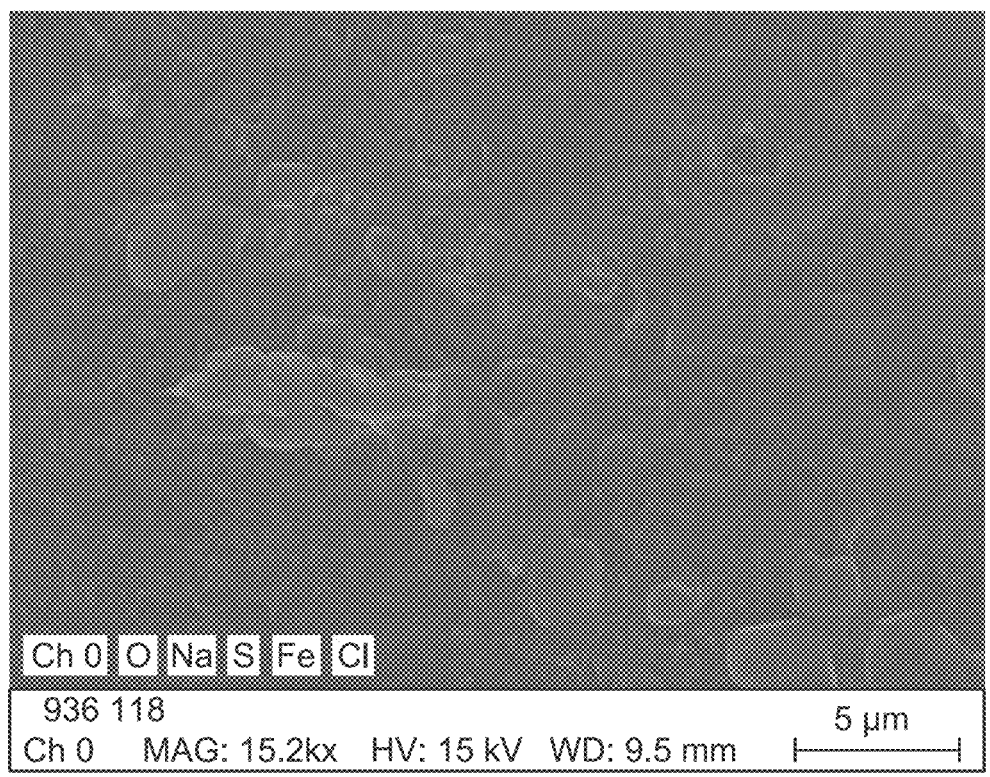
FIG. 12B depicts EDX analysis of magnetite sample in wet condition without EDTA, according to certain embodiments.
Figure 12C:
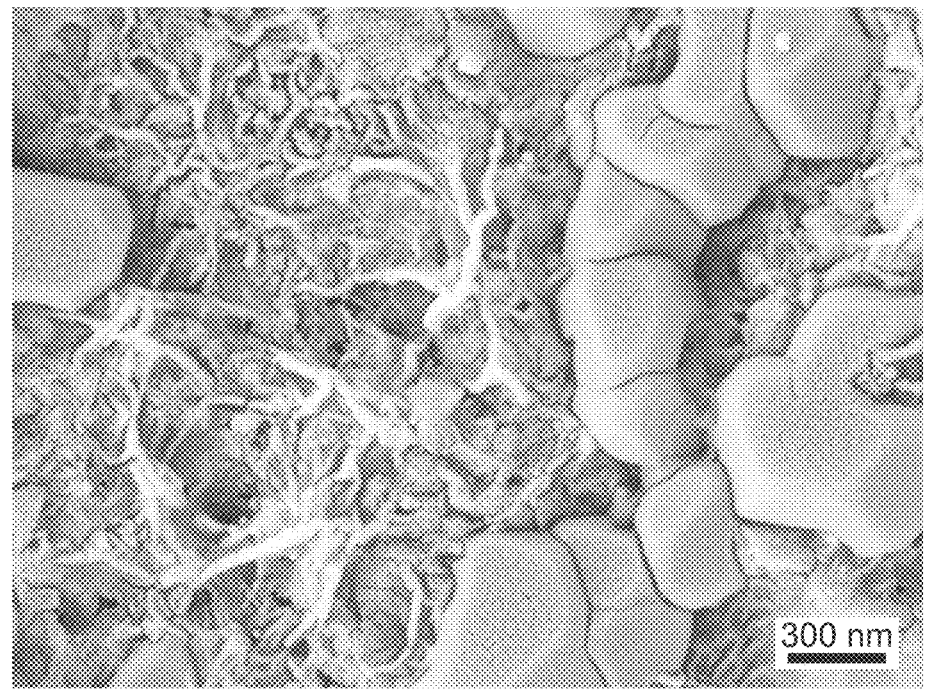
FIG. 12C depicts SEM images of magnetite sample in wet condition with EDTA, according to certain embodiments.
Figure 12D:
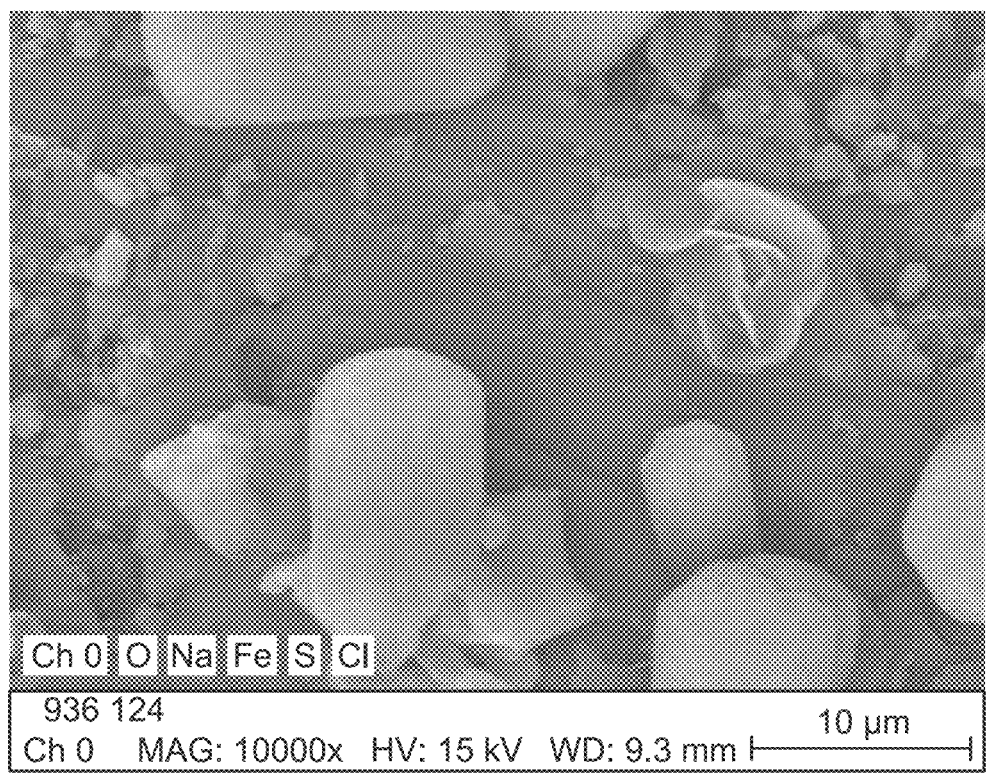
FIG. 12D depicts EDX analysis of magnetite sample in wet condition with EDTA, according to certain embodiments.

In the cases of dry conditions where the magnetite samples are exposed to hydrogen in the absence of brine, the results of the SEM analysis are shown in FIG. 11A. FIG. 11A is the case of magnetite exposure to hydrogen gas without EDTA treatment and its EDX analysis is shown in FIG. 11B. From the images, as shown in FIG. 11A, it may be observed that the spots which covered the surface of the sample in the intact sample and presumed to be the hydrogen gas bonding sites have significantly reduced, as shown in FIG. 10A. This agrees with the earlier discussed HI values which reduced from 543, as shown in FIG. 2, in the intact sample to 161 in the case of exposure to hydrogen gas, as shown in FIG. 3. This further supports the earlier assumption which implied that the spots on the sample surface represent the hydrogen binding ability of the mineral surface. In the case where the magnetite sample is treated with DTA and dried before exposure to hydrogen gas under dry conditions, the SEM images reveal that the surface behaves differently, as fewer spots are observed. Although the spots become larger compared to the case without EDTA treatment. This further corroborates the observations of the reduction of HI upon hydrogen gas exposure in dry cases. Thus, under dry conditions, the binding affinity of the hydrogen gas on the surface is reduced both with and without EDTA treatment in dry conditions. Additionally, the EDX images of the samples, especially in the case with EDTA treatment show that the sample surface is dominated by Fe and O, as shown in FIGS. 11B-11D, In the wet condition, which is where the magnetite sample is immersed in brine and then exposed to hydrogen gas in the presence of brine, the SEM images are shown in FIGS. 12A and 12C. Unlike in the dry case, the presence of NaCl salt on the sample surface is observed in both the SEM, as shown in FIGS. 12A and 12C, images and the EDX images, as shown in FIGS. 12B and 12D. More so, in the case of the EDTA-treated sample, the voids created because of the treatment are apparent. EDTA treatment on iron minerals has been reported to chelate Fe from the sample surface. Thus, from the HI discussed earlier, it may be implied that the Fe element is important to the hydrogen binding affinity of the iron minerals. Thus, the removal of Fe may reduce or serve as a retrieval mechanism for adsorbed hydrogen. Thus, the SEM analysis corroborates the assertion on the storage of hydrogen on magnetite surfaces in wet conditions and its retrieval by EDTA treatment.

Figure 13A:
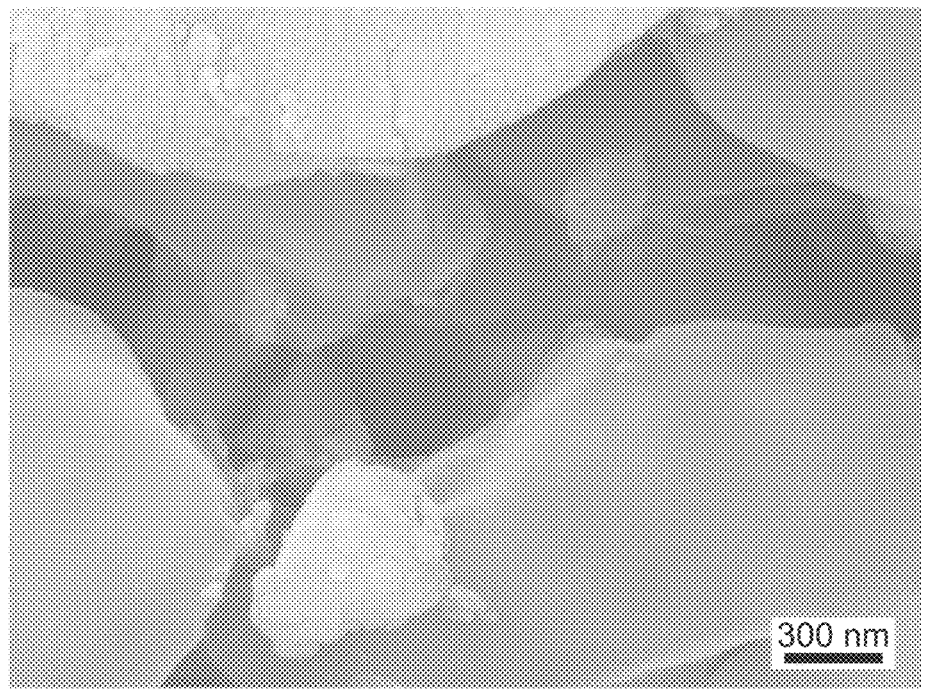
FIG. 13A depicts SEM image of intact pyrite, according to certain embodiments.
Figure 13B:
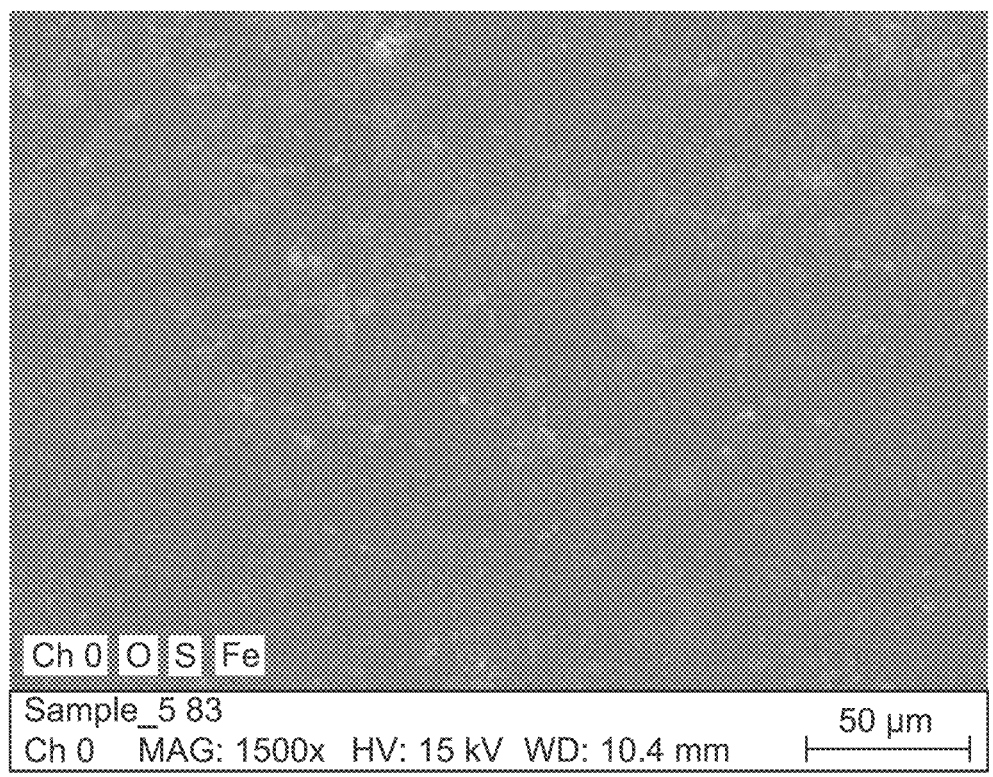
FIG. 13B depicts EXD analysis of intact pyrite, according to certain embodiments.
Figure 14A:
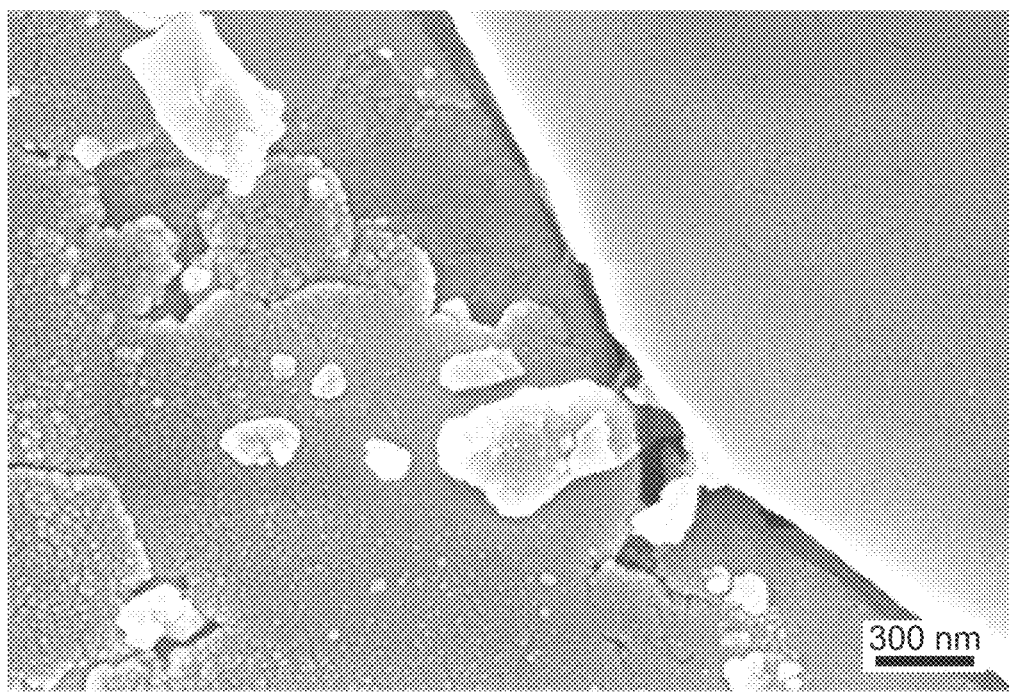
FIG. 14A depicts SEM images of pyrite sample in dry condition without EDTA, according to certain embodiments.
Figure 14B:
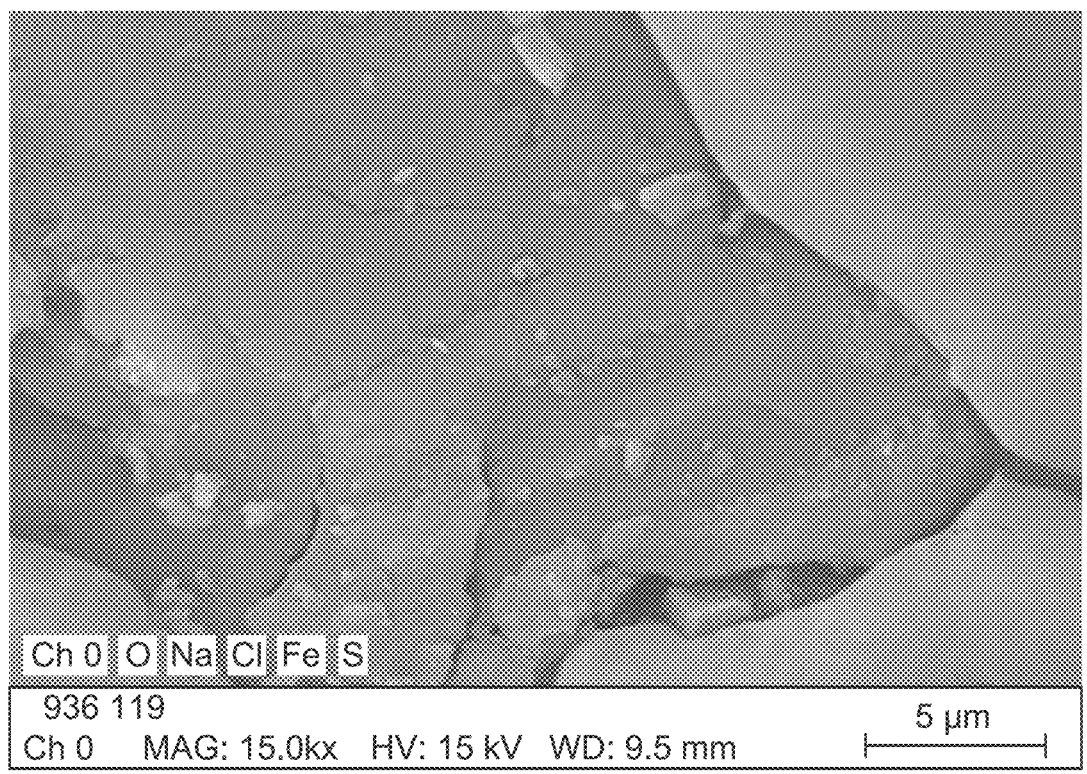
FIG. 14B depicts EDX analysis of pyrite sample in dry condition without EDTA, according to certain embodiments.
Figure 14C:
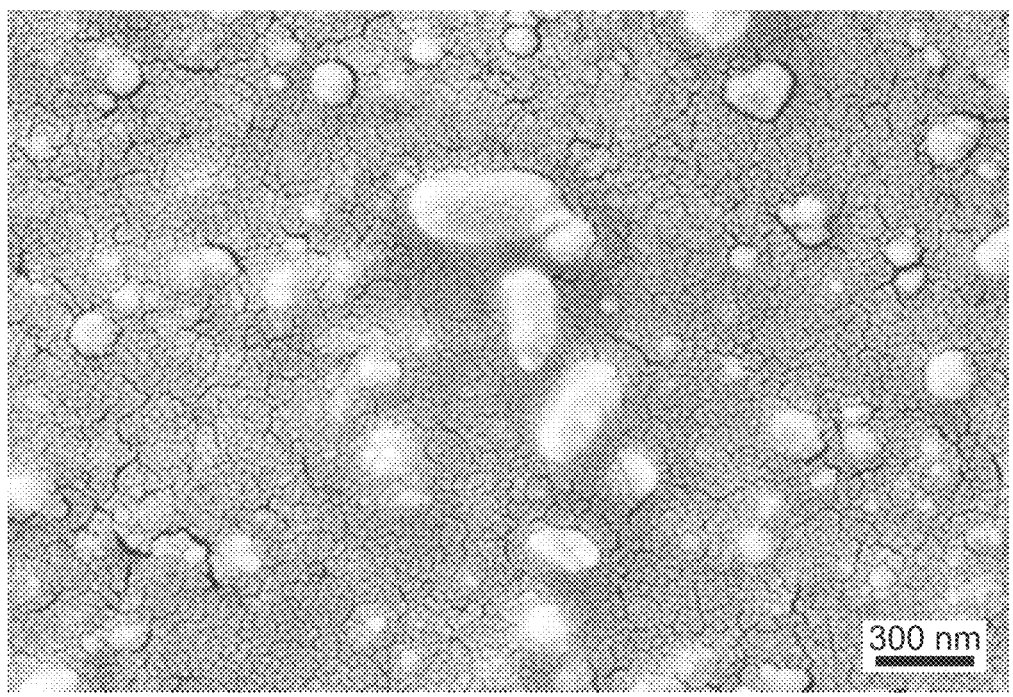
FIG. 14C depicts SEM images of pyrite sample in dry condition with EDTA, according to certain embodiments.
Figure 14D:
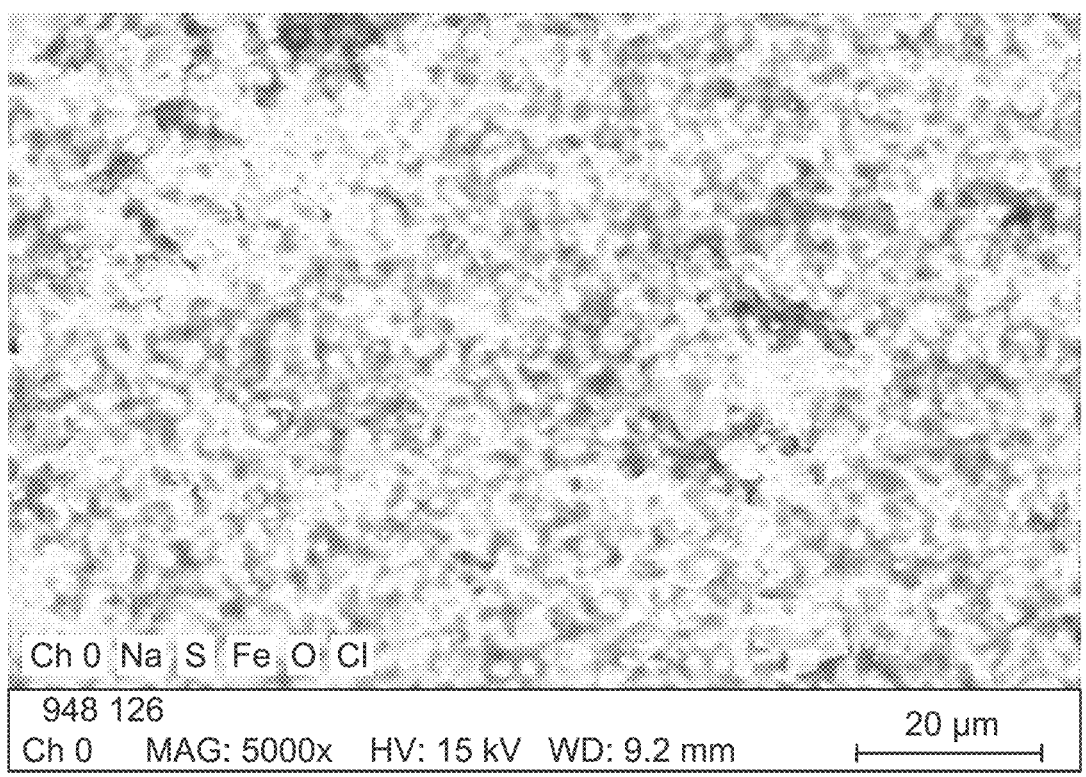
FIG. 14D depicts EDX analysis of pyrite sample in dry condition with EDTA, according to certain embodiments.

The SEM image of the intact pyrite sample and its EDX is shown in FIGS. 13A-13B. Unlike the case of magnetite, which had the whole sample surface covered by the spots, as shown in FIG. 10A, which may represent hydrogen binding sites, the pyrite sample has significantly fewer spots, as shown in FIG. 13A. This agrees with the lower HI of 20 compared to 543 of magnetite in the native state. More so, the EDX confirms the presence of Fe and S which is the elemental composition of pyrite, as shown in FIG. 13B. SEM images of the pyrite sample exposed to hydrogen gas in the dry condition are shown in FIGS. 14A and 14C. A close look at FIG. 14A which is the sample exposed to hydrogen without EDTA treatment reveals that the spots which were less in the native state even got lower in number, thus, agreeing with the reduction of the HI depicted in FIG. 5. On the other hand, in the same dry conditions, if the samples were treated with EDTA prior to exposure to hydrogen gas, larger spots, as shown in FIG. 14C, are seen on the sample surface which corroborate the increase in HI from a value of 17 without treatment to 362 with treatment, as shown in FIG. 5. Thus, it may be implied that even in dry conditions, the treatment of the samples with EDTA enhances its ability to adsorb hydrogen gas and to release the gas. Further, the sample needs to be in a dry state which may be achieved by other means. Additionally, it may be observed that the EDTA treatment resulted in the creation of voids on the sample surface as shown in the EDX images of FIG. 14D compared to instances without treatment, as shown in FIG. 14C.

Figure 15A:
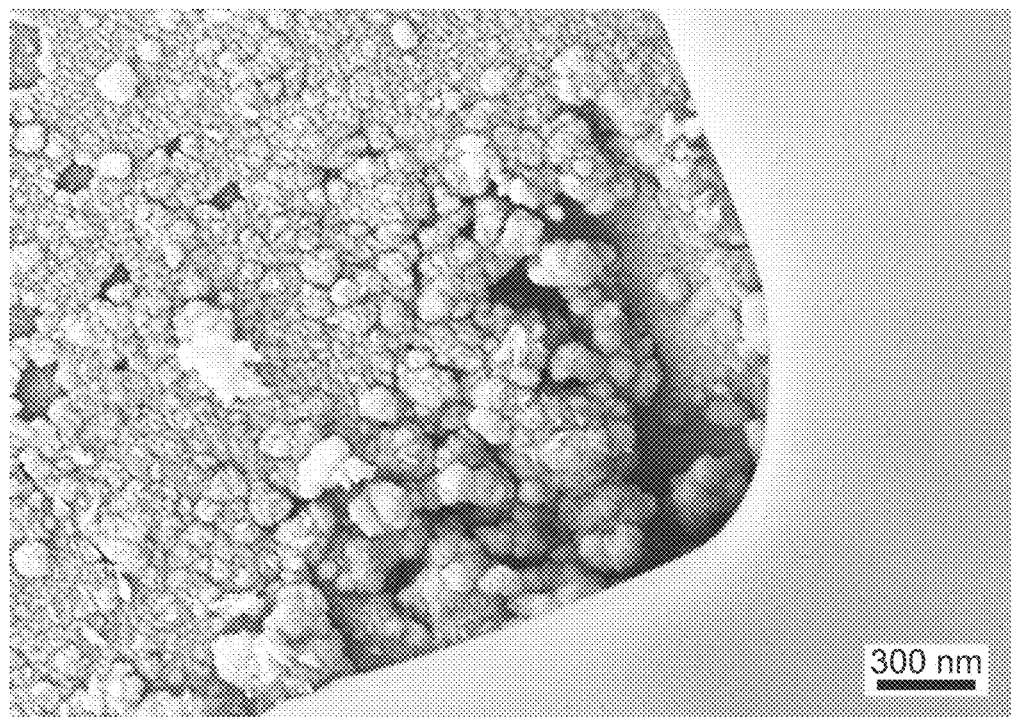
FIG. 15A depicts SEM images of pyrite sample in wet condition without EDTA, according to certain embodiments.
Figure 15B:
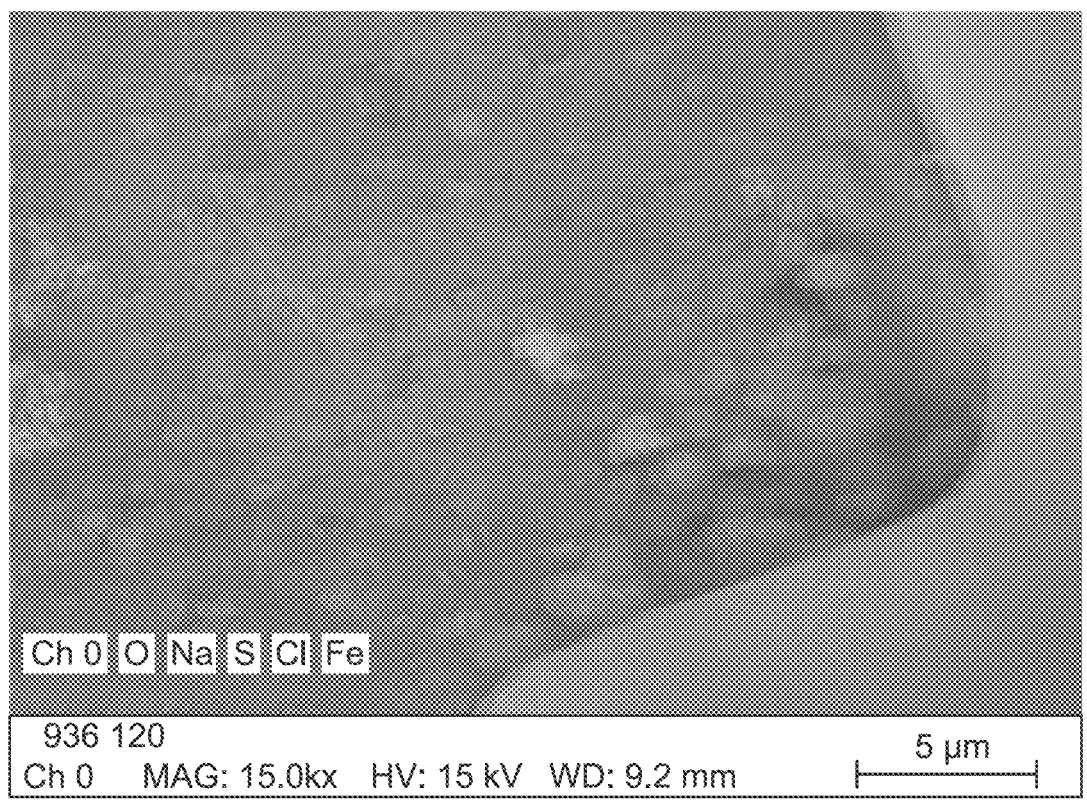
FIG. 15B depicts EDX analysis of pyrite sample in wet condition without EDTA, according to certain embodiments.
Figure 15C:
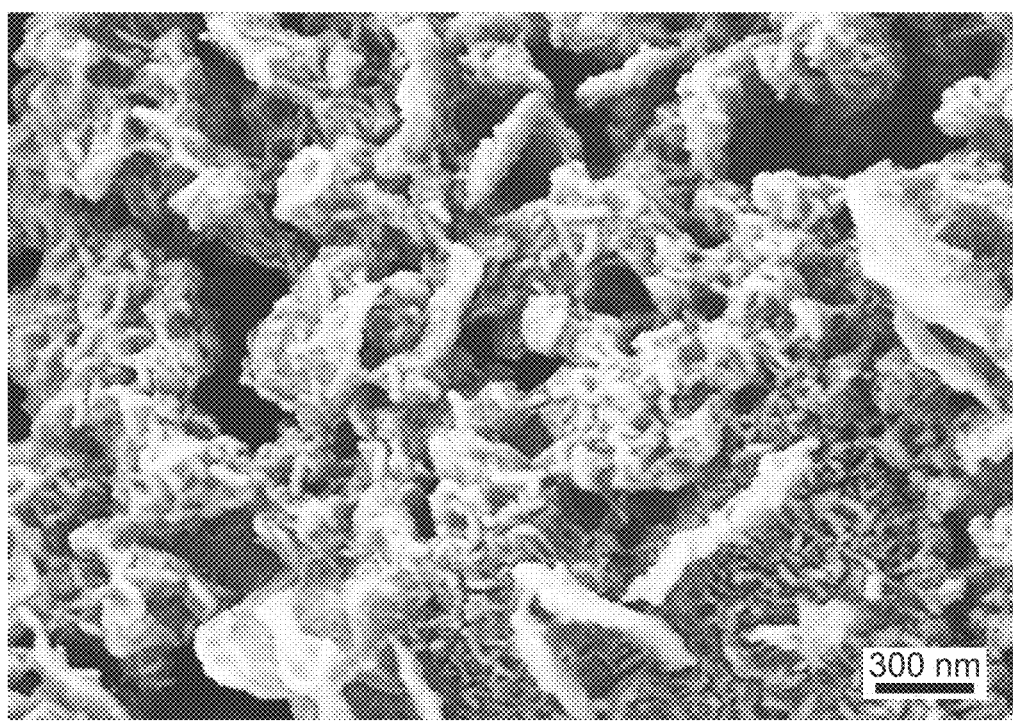
FIG. 15C depicts SEM images of pyrite sample in wet condition with EDTA, according to certain embodiments.
Figure 15D:
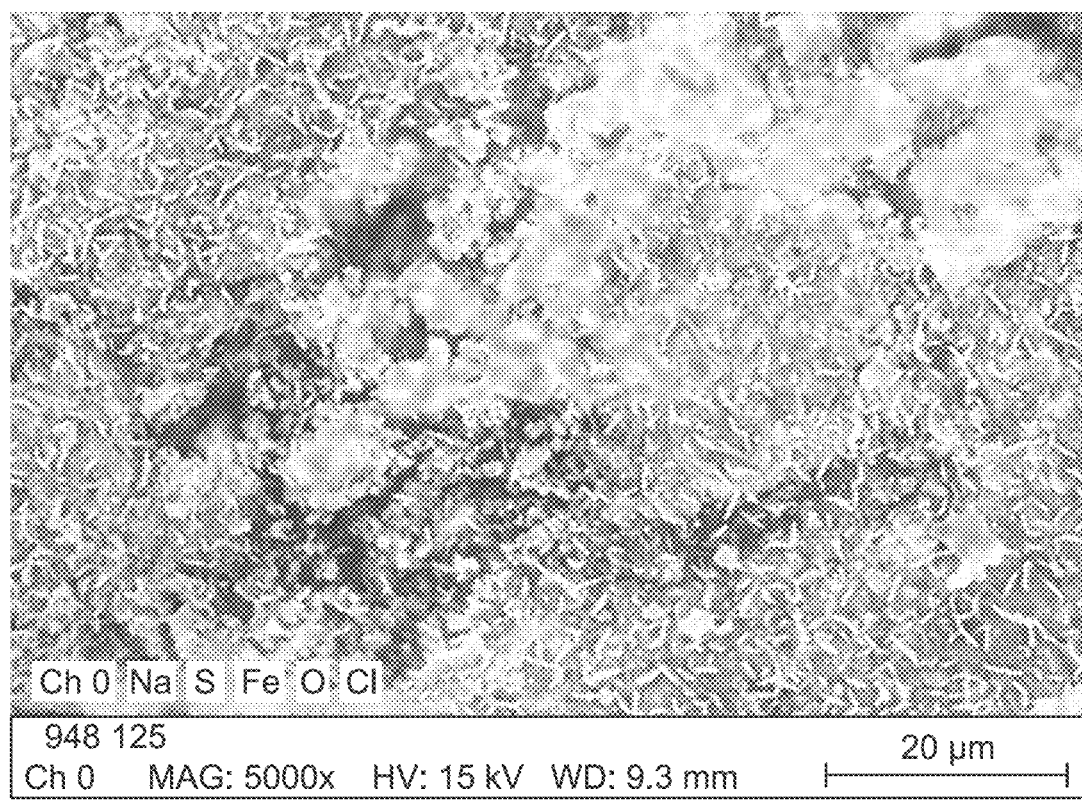
FIG. 15D depicts EDX analysis of pyrite sample in wet condition with EDTA, according to certain embodiments.

The SEM images of pyrite in the wet conditions depicted in FIGS. 15A and 15C show that in all cases, NaCl salt adsorption on the pyrite sample takes place, as shown in FIGS. 15A-15D. Thus, the coverage of the surface in the presence of brine in the case without EDTA treatment may be responsible for the low adsorption of hydrogen on the pyrite surface, as shown in FIG. 15A. On the other hand, the treated sample, as shown in FIG. 15C when exposed to hydrogen showed a high amount of hydrogen gas adsorption, as shown in FIG. 5. Thus, in both cases of dry and wet, pyrite samples when treated with EDTA, its hydrogen adsorption capacity is increased. Therefore, it may be said that the SEM and EDX analysis of the samples herein corroborates the discussed HI values above.

In this disclosure, DFT calculations and experimental analysis are used to support the assessment of the potential for hydrogen storage in formations rich in iron minerals by examining the interaction of iron minerals with hydrogen. This is the first attempt, despite the numerous studies that have been published in the literature, to quantitatively investigate the possibility of iron minerals acting as media for storing hydrogen and to develop a procedure that ensures both the storage of hydrogen and its retrieval for use. Thus, based on findings from both experimental data and DFT calculations, the conclusions that may be drawn are that iron mineral, magnetite being the most promising, may be utilized as hydrogen gas storage media. Further, the ability for hydrogen to be adsorbed onto iron mineral surfaces is significantly influenced by the state of the minerals, whether they are dry or in the presence of brine. Still further, the treatment with EDTA as a chelating agent may enhance hydrogen adsorption (in the case of pyrite). It may be utilized as a strategy for hydrogen recovery (in the case of magnetite). Thus, chemical methods are used to recover hydrogen following adsorption. Hydrogen may bind onto the iron mineral surfaces by forming covalent bonds and the order of binding affinity to the minerals is hematite>pyrite>magnetite. The binding affinity of hydrogen correlates with the HI reduction in the dry state. Several banded iron formations throughout the world may be used to store hydrogen gas, therefore this has enormous industrial potential. Consequently, the downside of widespread adoption of underground storage has been the provision of the necessary storage security which is demonstrated in this disclosure. Furthermore, the hardness and permeability of the sample are affected by its state, whether it is wet or dry. Further, there is a relationship between the hardness of the sample and the quantity of hydrogen adsorbed on it. Still further, treatment of pyrite with hydrogen results in significant permeability increase.

Numerous modifications and variations of the present disclosure are possible in light of the above teachings. It is therefore to be understood that within the scope of the appended claims, the invention may be practiced otherwise than as specifically described herein.

The invention claimed is:

1. A method of hydrogen storage, comprising:
    injecting hydrogen into a subterranean banded iron formation comprising magnetite, hematite, and/or pyrite,
        wherein the hydrogen is mainly hydrogen ($H_2$) gas based on a total volume of the hydrogen,
        wherein the subterranean banded iron formation is mainly magnetite, hematite, and/or pyrite based on a total weight of the subterranean banded iron formation,
        wherein the hydrogen is adsorbed on the magnetite, the hematite, and/or the pyrite,
    injecting ethylenediaminetetraacetic acid into the subterranean banded iron formation to release the hydrogen from the magnetite, the hematite, and/or the pyrite.

2. The method of claim 1, further comprising:
    injecting a brine solution into the subterranean banded iron formation before injecting the hydrogen.
3. The method of claim 2, wherein the subterranean banded iron formation is at least 80% by weight magnetite and has a hydrogen index of 640 to 670 mg $H_2$/g.
4. The method of claim 2, wherein the subterranean banded iron formation is at least 80% by weight hematite and has a hydrogen index of 670 to 690 mg $H_2$/g.
5. The method of claim 2, wherein the subterranean banded iron formation is at least 80% by weight pyrite and has a hydrogen index of 520 to 540 mg $H_2$/g.
6. The method of claim 2, wherein the brine solution comprises sodium chloride, sodium bicarbonate, sodium sulfate, magnesium chloride, and calcium chloride.
7. The method of claim 2, wherein the brine solution has a total dissolved solids concentration of 57,000 to 58,000 ppm.
8. The method of claim 1, further comprising:
    injecting an ethylenediaminetetraacetic acid solution into the subterranean banded iron formation before injecting the hydrogen.
9. The method of claim 8, wherein the subterranean banded iron formation is at least 80% by weight hematite and has a hydrogen index of 740 to 770 mg $H_2$/g.
10. The method of claim 1, wherein the subterranean banded iron formation is at least 80% by weight hematite and has a hydrogen index of 520 to 530 mg $H_2$/g.
11. The method of claim 1, wherein the subterranean banded iron formation is at least 80% by weight magnetite and has a hydrogen index of 540 to 550 mg $H_2$/g.
12. The method of claim 1, wherein the subterranean banded iron formation comprises at least 80% by weight magnetite and has an average grain size of 50 to 55 μm.
13. The method of claim 1, wherein the subterranean banded iron formation comprises at least 80% by weight hematite and has an average grain size of 25 to 30 μm.
14. The method of claim 1, wherein the subterranean banded iron formation comprises at least 80% by weight pyrite and has an average grain size of 5 to 10 μm.
15. The method of claim 1, wherein a pressure of the hydrogen in the subterranean banded iron formation is 500 to 1500 psi.
16. The method of claim 1, wherein the subterranean banded iron formation is at a temperature of 50 to 100° C. during the injecting.
17. The method of claim 1, wherein the subterranean banded iron formation magnetite comprises 66 to 72 percent by weight (wt. %) iron(II, III) oxide, 25 to 30 wt. % silicon dioxide ($SiO_2$), and 1 to 4 wt. % vermiculite (($Mg$, $Fe^{2+}$, $Fe^{3+}$)$_3$[($Al$, $Si$)$_4O_{10}$]($OH$)$_2 \cdot 4H_2O$) based on a total weight of the magnetite.
18. The method of claim 1, wherein the subterranean banded iron formation hematite comprises at least 99 wt. % iron(III) oxide based on a total weight of the hematite.
19. The method of claim 1, wherein the subterranean banded iron formation pyrite comprises 80 to 85 wt. % iron sulfide ($FeS_2$) and 15 to 20 wt. % $SiO_2$ based on a total weight of the pyrite.
20. The method of claim 1, wherein the subterranean banded iron formation comprises at least 80% by weight hematite and a binding energy of the hydrogen to the hematite is −13 to −11 kcal/mol.

* * * * *